(12) United States Patent
Nielsen

(10) Patent No.: US 7,012,503 B2
(45) Date of Patent: Mar. 14, 2006

(54) ELECTRONIC KEY DEVICE A SYSTEM AND A METHOD OF MANAGING ELECTRONIC KEY INFORMATION

(75) Inventor: Ernst Lykke Nielsen, Køge (DK)

(73) Assignee: Bording Data A/S, Glostrup (DK)

( * ) Notice: Subject to any disclaimer, the term of this patent is extended or adjusted under 35 U.S.C. 154(b) by 270 days.

(21) Appl. No.: 10/129,963

(22) PCT Filed: Nov. 30, 2000

(86) PCT No.: PCT/DK00/00655

§ 371 (c)(1),
(2), (4) Date: May 21, 2002

(87) PCT Pub. No.: WO01/40605

PCT Pub. Date: Jun. 7, 2001

(65) Prior Publication Data

US 2002/0180582 A1    Dec. 5, 2002

(30) Foreign Application Priority Data

Nov. 30, 1999    (DK) ............................ 1999 01714

(51) Int. Cl.
*G05B 19/00* (2006.01)
*G06F 7/00* (2006.01)
*G08B 29/00* (2006.01)
*H04B 1/00* (2006.01)

(52) U.S. Cl. .................... 340/5.6; 340/5.61; 340/5.64; 340/5.65

(58) Field of Classification Search ................ 340/5.6, 340/5.61, 5.62, 5.64, 5.65, 5.66, 5.7, 5.23, 340/5.1; 70/63, 168, 277; 109/59, 64; 455/557
See application file for complete search history.

(56) References Cited

U.S. PATENT DOCUMENTS

| | | | |
|---|---|---|---|
| 4,677,284 A | * | 6/1987 | Genest ........................ 235/487 |
| 4,829,296 A | | 5/1989 | Clark et al. ............ 340/825.31 |
| 4,926,665 A | | 5/1990 | Stapley et al. ................ 70/277 |
| 5,397,884 A | | 3/1995 | Saliga ...................... 235/382.5 |
| 5,473,318 A | * | 12/1995 | Martel ........................ 340/5.23 |
| 5,668,876 A | * | 9/1997 | Falk et al. ................... 380/271 |
| 5,905,446 A | | 5/1999 | Benore et al. .......... 340/825.34 |
| 5,909,183 A | * | 6/1999 | Borgstahl et al. ....... 340/825.22 |

(Continued)

FOREIGN PATENT DOCUMENTS

DE    196 44 237    4/1998

(Continued)

*Primary Examiner*—Michael Horabik
*Assistant Examiner*—Nam Nguyen
(74) *Attorney, Agent, or Firm*—Jacobson Holman PLLC

(57) ABSTRACT

An efficient method and a system for controlling access to a location secured by a lock mechanism controlled by a lock control unit, which may provide a high degree of flexibility and a high level of security. The method includes the steps of storing a first access code in the lock control unit, the first access code being indicative of a predetermined access right to the location, and storing a plurality of access codes including a second access code in an electronic key device. Using the electronic key device, access to the location is requested by initiating transmission of the second access code to the lock control unit where the transmitted second access code is compared with the first access code and, if the first access code corresponds to the second access code, operation of the lock mechanism is initiated. The user can edit and rearrange the plurality of access codes to obtain access to a plurality of locations.

38 Claims, 14 Drawing Sheets

U.S. PATENT DOCUMENTS

| | | | |
|---|---|---|---|
| 5,942,985 A * | 8/1999 | Chin | 340/5.61 |
| 5,964,877 A * | 10/1999 | Victor et al. | 713/202 |
| 6,038,666 A * | 3/2000 | Hsu et al. | 713/186 |
| 6,097,306 A * | 8/2000 | Leon et al. | 340/5.1 |
| 6,359,547 B1 * | 3/2002 | Denison et al. | 340/5.73 |
| 6,484,260 B1 * | 11/2002 | Scott et al. | 713/186 |

FOREIGN PATENT DOCUMENTS

| | | |
|---|---|---|
| DE | 197 48 054 | 5/1999 |
| EP | 0 410 024 | 1/1991 |
| EP | 0 810 559 | 12/1997 |
| FR | 2 738 436 | 3/1997 |
| WO | 93/14571 | 7/1993 |
| WO | 94/01963 | 1/1994 |
| WO | 95/25391 | 9/1995 |
| WO | 96/01542 | 1/1996 |
| WO | 97/22772 | 6/1997 |
| WO | 98/25000 | 6/1998 |

* cited by examiner

ELECTRONIC KEY DEVICE A SYSTEM AND A METHOD OF MANAGING ELECTRONIC KEY INFORMATION

This is a nationalization of PCT/DK00/00655 filed Nov. 30, 2000 and published in English.

BACKGROUND OF THE INVENTION

1. Field of the Invention

The invention relates to a method of controlling access to a location, where access to the location is restricted by a lock mechanism. Further the invention relates to an access control system which allows suppliers of goods or services to access a location, which would otherwise prevent delivery of the goods or the services. Further the invention relates to an electronic key device, a lock control unit and a computer system for use in such a system, a storage module for use in such an electronic key device, and a method of managing a predetermined access right to a location.

2. Description of the Related Art

Particularly in blocks of flats or companies it is common that a number of outer or front doors or intermediate doors must be passed before getting to a point of service, such as an apartment door, a mailbox, a service station or a meter for appliances, an area to be cleaned, etc. For example in case of delivery of newspapers, the delivery man often has to gain access to a stairway in order to be able to deliver the newspapers at the locked private doors or put them into the letter boxes. It frequently causes great difficulties to the delivery men to find the correct keys in a large bundle of keys, and the locks are frequently exchanged without the delivery company being informed of this. For reasons of security it is also more and more common to lock doors or gates to backyards, residential areas or company properties, where for example refuse containers may be placed, so that the refuse collection firms have a problem quite similar to the firms which deliver newspapers. It will be appreciated that similar problems are faced by:

- postmen
- cleaning companies
- emergency physicians
- home help and other care workers
- policemen
- firemen
- artisans
- caretakers/superintendents
- and others.

Some of the above service providers require access on a daily basis, such as postmen, some may require access at certain time periods, such as on certain weekdays or at certain times of the day, for example a newspaper delivery man may require access between 6 a.m. and 9 a.m. Furthermore, different services/deliveries may require different access rights, for example firemen, security companies or police may require access to all facilities, while a mailman only requires access to a mailbox.

International patent application WO 93/14571 discloses a secure entry system utilising a cellular telephone as an electronic key device. In this prior art system a user operates the cellular telephone to transmit RF signals to a lock, allowing a user to operate the buttons on the telephone as he would buttons on a key card to gain access to the secured area. The lock checks whether the user identified by the button operations is on a list of authorised users maintained in the lock memory.

storing a first access code in the first storage means, the first access code being indicative of a predetermined access right to the location;

storing a second access code in a second storage means;

using an electronic key device for requesting access to the location by initiating transmitting the second access code from the second storage means to the lock control unit;

comparing the transmitted second access code with the first access code stored in the first storage means; and

SUMMARY OF THE INVENTION if the first access code corresponds to the second access code, initiating operating the lock mechanism.

Consequently, it is an advantage of the invention that a plurality of different access codes to different buildings may be stored and related to one or more electronic key devices, providing a flexible way of customising an access right profile for each electronic key device.

It is another advantage of the invention that each lock control unit may be provided with a specific set of valid access codes for that particular lock control unit. Therefore, a high degree of advanced functionality may be implemented by the method according to the invention, such as different security levels for a given building, self-destructive access codes, conditioned access codes, access codes for limited periods of times, etc.

It is a further advantage of the invention that the access right profile of individual electronic key devices and lock control units may be changed on short notice or in regular or random time intervals in order to increase the security of the access control.

Hence, it is a problem of the above prior art system that it requires a manual entering of some sort of user identification code allowing the lock to check whether the identified user is on the list of authorised users. However, a manual entering of such a code is a lengthy process, in particular if the code is sufficiently long in order to provide sufficient security. The entering of the code requires some time and, in particular, in case of erroneous entering of a code, access may be denied requiring a repetition of the manual entering.

Thus an object of the invention is to provide an efficient method and a system for controlling access to a location secured by a lock mechanism controlled by a lock control unit, which may provide a high degree of flexibility and a high level of security.

This is achieved when a method of controlling access to a location secured by a lock mechanism controlled by a lock control unit including first storage means comprising the steps of storing a first access code in the first storage means, the first access code being indicative of a predetermined access right to the location;

storing a second access code in a second storage means of an electronic key device;

using the electronic key device for requesting access to the location by transmitting the second access code from the electronic key device to the lock control unit;

comparing the transmitted second access code with the first access code stored in the first storage means; and if the first access code corresponds to the second access code, initiating operating the lock mechanism is characterised in that the method further comprises the step of storing a plurality of access codes for a plurality of respective locations in the second storage means, enabling a user to initiate transmitting a selected one of the stored access codes to the lock control unit.

Consequently, it is an advantage of the invention that a plurality of different access codes to different buildings may be stored and related to one or more electronic key devices, providing a flexible way of customising an access right profile for each electronic key device.

It is another advantage of the invention that each lock control unit may be provided with a specific set of valid access codes for that particular lock control unit. Therefore, a high degree of advanced functionality may be implemented by the method according to the invention, such as different security levels for a given building, self-destructive access codes, conditioned access codes, access codes for limited periods of times, etc.

It is a further advantage of the invention that the access right profile of individual electronic key devices and lock control units may be changed on short notice or in regular or random time intervals in order to increase the security of the access control.

A location according to the invention may be a physical location, such as a building, an area, or some other residential, industrial, commercial or office facility, where access to the location is controlled by a lock mechanism, such as a physical lock at a door, a window, a gate or the like. Access to the location may be controlled at a single point of entry or at a plurality of access points. Furthermore, a location may also be a part of a building, area, etc., and, according to the invention, access to different parts of a location may be controlled individually, such as at an outer gate, a front door, within an elevator granting access at all or selected floors, at doors to individual apartments, offices, sections, rooms, storage facilities, such as drawers, safes, etc. The location may be stationary, such as a building, or mobile such as a vehicle, a container, a ship, or the like.

Furthermore, the location may also be an installation, such as a control unit of industrial facility, an electric meter, a computer system or the like, where access to the location is controlled by a lock mechanism, such as a physical lock at a control box, or an electronic lock, such as a hardware lock of a computer. The term access to a location may also comprise user access to a computer or computer program where access is controlled by a software lock mechanism restricting access to a software application, to stored data, communications facilities, or the like.

An access right according to the invention may be the right to interact with a location. Examples of access rights include the right to enter a building, an area, a facility, etc., the right to operate a machine, a device, a vehicle, a computer, etc., the right to open or close a door, a window, a container, a box, etc., and the right to receive or deliver goods, data information, etc., as long as the access right can be controlled by a lock mechanism.

An access right may have certain attributes specifying properties of the access right. Examples of such properties include one or more validity periods, a security level, an identification of related lock control units and/or electronic key devices, a password, a number of times the access right is valid, or any other attribute specifying a property of the access right.

When the electronic key device is a mobile communications device, the method may be implemented with standard devices, which may be used for regular communications purposes.

When the electronic key device comprises the second storage means, the transmission of the second access code to the lock control unit may be based upon a short range, fast communications channel.

Consequently, in a preferred embodiment the method further comprises the step of transmitting the second access code from the electronic key device to the lock control unit. It is an advantage of this embodiment that the direct communication is fast and does not need to involve an additional communications network provider.

When the step of transmitting the second access code from the second storage means to the lock control unit comprises the step of transmitting the access code via wireless data communication, a fast and convenient interface between the electronic key device and the lock control unit may be provided without the need of physical contact.

In a preferred embodiment of the invention the wireless data communication utilises infrared data communication. It is an advantage of this embodiment that the communication may be based upon reliable standard components which are available as part of many devices, such as mobile phones, personal digital assistants, or the like.

When the second storage means is a removable storage module adapted to be removably inserted into the electronic key device, a standard device may be easily adapted for the use according to the invention and access codes may be transferred to the electronic key device by insertion of a suitable storage module.

When the method further comprises the step of transmitting, via a communications network, at least one access code from an access code management system to a selected one of the electronic key device and the lock control unit, access codes may be generated and maintained at a central computer system and transmitted to the electronic key device or the lock control unit. It is an advantage of the invention that an access code may be transmitted to a plurality of electronic key devices and lock control units substantially simultaneously. Hence, a synchronisation between lock control units and electronic key devices may be ensured at all times.

When the method further comprises the steps of sending a request from the electronic key device to an access code management system comprising the second storage means; and transmitting the second access code from the access code management system to a selected one of the electronic key device and the lock control unit, the access codes do not need to be stored in the electronic key device and storage space in the electronic key device may be saved. It is another advantage of the invention that the use of access codes may be supervised and tracked by a central access code management system.

When the method further comprises the step of storing a plurality of access codes for a plurality of respective locations in the second storage means, one electronic key device may be used for a plurality of locations without reducing the level of security.

When the method further comprises the step of storing a plurality of valid access codes corresponding to a plurality of respective access rights in the first storage means, different types of access rights may be provided via the same lock control unit. This may include different security levels or different types of interaction or access at the location.

When the method further comprises the step of storing in a third storage means information about attempts to access the location, a high degree of visibility about the use of the access codes may be provided as well as the basis for additional services.

When the access right comprises a first attribute specifying a property of the predetermined access right, and wherein the first access code comprises information about the first attribute, access codes with additional functionality, such as self-destructive access codes, etc., may be generated.

In a preferred embodiment of the invention the predetermined access right has a validity period and the first access code comprises information about the validity period.

When the method further comprises the step of invalidating the first access code, an access code may be replaced by a new access code, for example in cases of misuse or loss of an electronic key device.

As mentioned above the invention further relates to an access control system for controlling access to a location being secured by a lock mechanism, the access control system comprising
  an electronic key device including first transmitting means adapted to transmit a first control signal indicative of a request for granting a predetermined access right; and
  a lock control unit including first receiving means adapted to receive said first control signal from the electronic key device, first processing means adapted to perform a verification of the received request, and control means adapted to initiate operating the lock mechanism depending on the result of the verification;
  the system being characterised in that
  the electronic key device further comprises first storage means adapted to store a plurality of access codes identifying a plurality of predetermined access rights, enabling a user to initiate transmitting a selected one of the stored access codes to the lock control unit.

As the above system and its preferred embodiments correspond to the method and its preferred embodiments described above and in the following, and since it comprises corresponding advantages, not all of these advantages will be described again.

When the electronic key device further comprises first input means for receiving data items identifying predetermined access rights, a plurality of access codes for a plurality of locations or access rights may be input, edited, rearranged, or the like.

When the electronic key device further comprises second input means for receiving data items input by a user, the data items identifying predetermined access rights, access codes may be input by the user.

When the electronic key device further comprises third input means adapted to receive input from a user indicating a selection of a first one of the plurality of access rights stored in the first storage means; and display means for displaying information about at least one of the plurality of access rights stored in the first storage means, a user interface is provided to the user for selecting a desired access right from a plurality of stored access rights.

When the data items stored in the first storage means comprise access codes for predetermined access rights, the lock control unit may compare received access codes with a plurality of stored access codes.

Consequently, in a preferred embodiment of the invention a selected one of the first and second control signals comprises a first access code for the requested access right.

In a further preferred embodiment of the invention the lock control unit further comprises second storage means adapted to store a plurality of data items corresponding to a plurality of access codes for respective predetermined access rights; and wherein the first processing means is adapted, upon receipt of the first control signal, to compare the first access code received via the first control signal with at least one of the plurality of access codes stored in the second storage means.

It is an advantage of the invention that it provides a high level of security.

In yet another preferred embodiment of the invention the electronic key device is a portable communications device.

When the first receiving means is adapted to receive the first control signal, the first control signal indicative of the request for granting the requested access right may be transmitted directly from the electronic key device to the lock control unit.

In yet another preferred embodiment of the invention the first control signal is a wireless data communications signal.

In yet another preferred embodiment of the invention the first transmitting means is an infrared communications port.

When the lock control unit further comprises fourth input means for receiving data items corresponding to access codes granting predetermined access rights, access codes and other related data corresponding to a plurality of access rights, such as different security levels, time constraints, etc. may be stored and easily changed in the lock control unit.

When the lock control unit further comprises fifth input means for receiving data items input by a user, the data items corresponding to access codes granting predetermined access rights, an authorised user may input, edit, or delete access codes stored in the lock control unit, possibly after providing a password or another security verification.

Alternatively or additionally, when the system further comprises computer means including
  third storage means adapted to store a plurality of data items corresponding to respective predetermined access rights and including respective access codes;
  first communications means adapted to transmit at least one access code to a selected one of the electronic key device and the lock control unit; and
  the selected one of the electronic key device and the lock control unit further comprises second communications means adapted to receive the transmitted at least one access code, access codes may be transmitted from a central access code management system. This may be done in response to a specific request for an access right or in order to store one or more access codes in the electronic key device or in the lock control unit.

In yet another preferred embodiment of the invention a selected one of the electronic key device and the lock control unit further comprises third communications means for transmitting, to the computer means, an information signal indicative of information about the corresponding transmitted or received request for granting the requested access right.

It is an advantage of the invention that information about electronic key devices, access codes, access right grantees, the use of access codes, etc, may be acquired and maintained at a central service to provide optimal transparency and security to the access right owner.

In a preferred embodiment of the invention the first communications means is adapted to transmit a second control signal to the lock control unit initiating invalidation of at least one access code.

In a preferred embodiment of the invention the requested access right comprises a first attribute specifying a property of the requested access right, and wherein the first access code comprises information about the first attribute.

In a preferred embodiment of the invention the requested access right has a validity period, and the first access code comprises information about the validity period.

The invention further relates to a lock control unit for use in a system described above and in the following, wherein the lock control unit comprises first receiving means adapted to receive a control signal indicative of a request for granting a requested access right, first processing means adapted to perform a verification of the received request, and control means adapted to initiate operating a lock mechanism depending on the result of the verification.

The invention further relates to an electronic key device for use in a system described above and in the following, the electronic key device including first transmitting means adapted to transmit a first control signal indicative of a request for granting a predetermined access right;

wherein the electronic key device further comprises first storage means adapted to store access codes identifying a plurality of predetermined access rights, enabling a user to initiate transmitting a selected one of the stored access codes to the lock control unit.

The invention further relates to a removable storage module for use in an electronic key device described above and in the following, wherein the removable storage module is adapted to store data items identifying a plurality of predetermined access rights, enabling a user to initiate transmitting a selected one of the stored access codes to the lock control unit.

In a preferred embodiment of the invention, the removable storage module further comprises second processing means adapted to initiate transmitting a control signal indicative of a request for granting a selected one of the plurality of predetermined access rights.

The invention further relates to a computer system for use with a system described above and in the following, wherein the computer system comprises fourth storage means adapted to store a plurality of data items corresponding to respective access codes indicative of predetermined access rights;

third processing means adapted to generate a second access code indicative of a first access right;

fourth communications means adapted to transmit the second access code to a selected one of the electronic key device and the lock control unit for storing the second access code in the corresponding first or second storage means.

In a preferred embodiment of the invention the fourth processing means is adapted to generate a third access code, different from the second access code, corresponding to the first access right;

the fourth communications means is adapted to transmit the third access code to the lock control unit; and the fourth communications means is adapted to transmit a third control signal to the lock control unit initiating invalidation of the second access code.

In a further preferred embodiment of the invention the fourth processing means is adapted to initiate invalidation of the second access code and generating a third access code, corresponding to the first access right and different from the second access code, upon request from a user.

In another preferred embodiment of the invention, the fourth processing means is adapted to initiate invalidation of the second access code and generation of a fourth access code, corresponding to the first access right and different from the second access code, in predetermined time intervals.

The invention further relates to a method for using an access control system described above and in the following for managing a predetermined access right to a location, the access right being owned by an access right owner and to be granted to an access right grantee, the method comprising the steps of generating a first access code indicative of the access right;

transferring the first access code to a lock control unit, the control unit being adapted to control access to the location;

transferring a second access code to an electronic key device;

acquiring information data about the use of a selected one of the first and second access codes;

providing at least one additional service based on the acquired information data to a selected one of the access right owner and the access right grantee.

BRIEF DESCRIPTION OF THE DRAWINGS

The invention will be explained more fully below in connection with preferred embodiments and with reference to the drawings, in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1A:
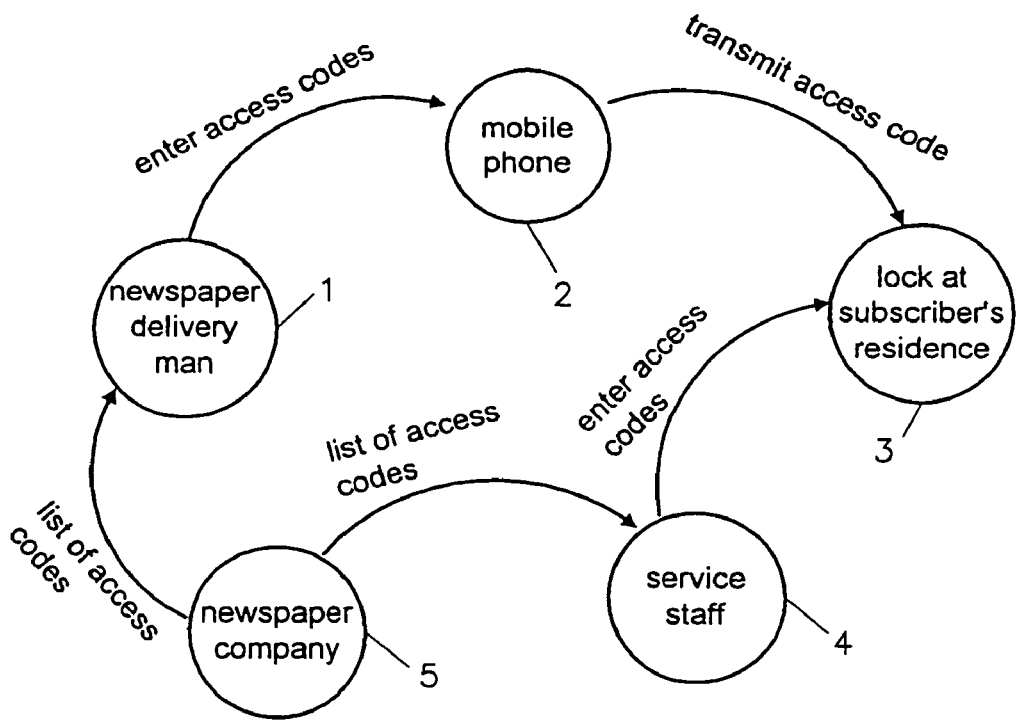
FIG. 1a–b show data flow diagrams of two embodiments of the access code management according to the invention.

FIG. 1a shows the principle of an embodiment of the invention using the delivery of newspapers as an example. The invention is, however, not restricted to the delivery of newspapers. If, in the first instance, it is imagined that the invention is worked by a single company, FIG. 1a may be explained as follows:

A newspaper company 5 has a number of subscribers who are to have their newspaper delivered to their respective residence. Information on the subscribers and their electronic access codes are kept in a database at the newspaper company 5. The information may be transferred from this database to a number of electronic key devices, such as mobile phones 2. A newspaper delivery man 1 may receive the information relevant for the subscribers on his route as a printed list including the access codes. The newspaper delivery man 1 may then enter the access codes into his mobile phone 2, preferably via the keypad of the mobile phone 2. Preferably, the access codes are stored on the SIM card of the mobile phone 2, and they may be entered in a special order which fits the delivery of goods and services, such as delivery of newspapers along a predetermined route. With this mobile phone 2, the delivery man 1 can get access to a locked stairway in a building when the mobile phone 2 is provided with the correct electronic access code information, which may be transmitted electronically from the mobile phone 2 to a lock 3 at the door to the residence. The lock 3 is adapted to receive the signals from the mobile phone 2 and to cause the door to be unlocked. The valid access codes may be manually entered into the lock, for example by service staff 4 receiving a printed list of valid access codes and their corresponding locks from the newspaper company 5. The service staff 4 may enter the access codes into the lock 3 via a keypad, dip switches or the like. As an additional advantage of the system according to this embodiment of the invention, the newspaper company 5 can see whether the delivery man 1 has unlocked the door to the stairway, e.g. in the event of a complaint of non-delivery of the newspaper.

The electronic key device of the invention and the associated management of electronic access code information, however, may also form the basis for several different companies.

Figure 1B:
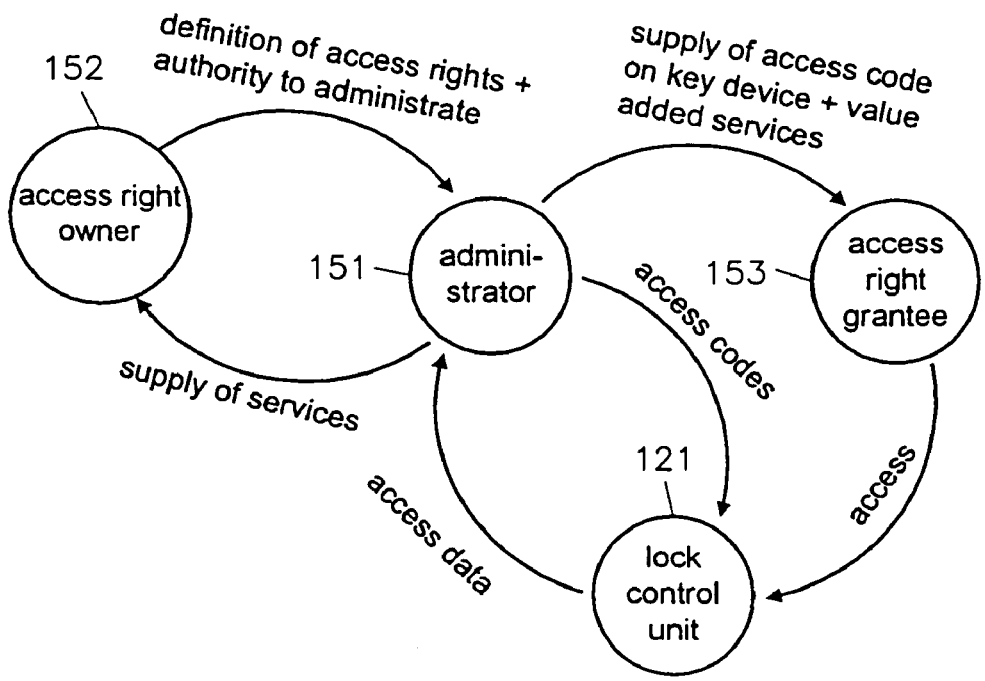

Again taking newspapers as an example, the different roles of the various companies and the corresponding data flow are described with reference to FIG. 1*b*. The first company involved may be the one that prints and delivers the newspaper and, therefore, it requires access to the subscriber's residence. As an access right grantee 153, the first company receives access codes from the access code administrator 151, a second company, organisation or person, who manages the electronic key system and who may operate as a service provider for the delivery of a number of different goods and services. The administrator 151 also transfers the access codes to the lock control units 121 which control the locks in the subscriber's residence. The administrator 151 may also supply the access right grantee 153 with the electronic key devices and, possibly, other necessary physical as well as nonphysical tools, by which, for example, the access right owner 152 may be able to administer both the lock control units 121 and the electronic key devices and access codes. This may happen under control of the administrator 151. Alternatively or additionally, a third company may be involved, which owns electronic key devices, or which may be a network operator transmitting access code information to mobile telephones used as an electronic key device. A fourth company may own the building or have a business agreement with the owner of the building to administer access to the building, and thus the fourth company may be the access right owner 152, who agrees with the administrator 151 about the installation of the lock control unit 121, and who defines the respective access rights for the different access right holders 153. The electronic control unit 121 may be owned and installed by the administrator 151, the access right owner 152, the access right grantee 153 or a fifth company. The administrator 151 may also provide value added services, such as performance statistics to the access right grantee 153 or the access right owner 152, based on access data acquired from the lock control unit 121. These services may be self-service functions, physical services, time and material services or plain information services.

The invention thus means that the use of modern technology can form the basis for new service companies that can make the delivery of goods and services more efficient, and which can guarantee the necessary security systems which the consumers will demand from an electronic key according to the invention.

It will be appreciated that the electronic key according to the invention may be supplemented with much other information that may be related to the use of the electronic key. For example, a delivery man can quickly get updated knowledge of changes relating to the subscribers. An emergency physician can get help in finding his way through the locked doors in a large block of flats. The cleaning staff can get updated information on changes concerning current activities.

Preferably, the relationship between the administrator 151 and the access right owner 152 is described in a contract, which preferably describes the terms under which the access right owner 152 grants certain rights to the administrator 151, such as the right to grant to other persons, for example within the administrator's organisation or third-party staff with whom the administrator may have a contract, the right to access a location or to perform a function in connection with the location.

Figure 2A:
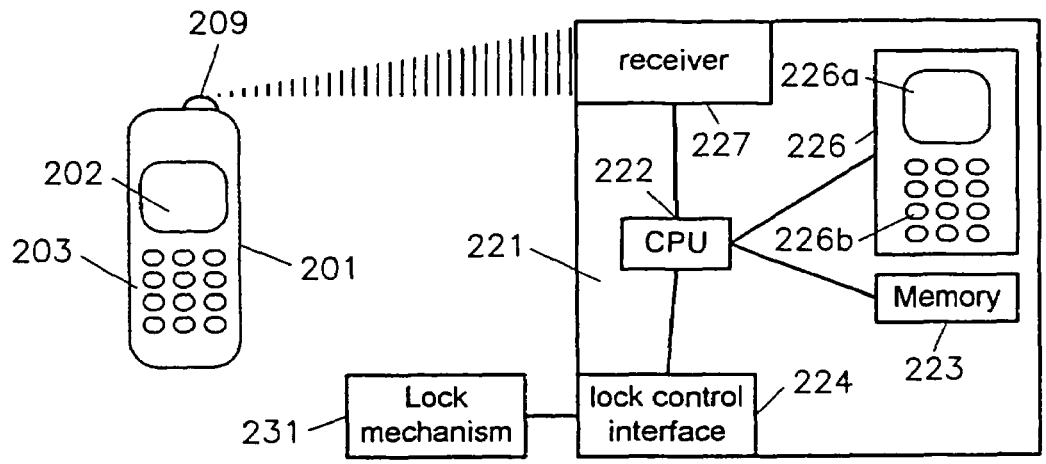
FIG. 2a–c show block diagrams of three embodiments of a system for controlling access to a location according to the invention.

Referring to FIG. 2*a*, a first embodiment of an access control system according to the invention comprises a mobile electronic key device 201 and a lock control unit 221 which controls a lock mechanism 231, such as a lock of a door. The electronic key device 201 comprises a display 202 for displaying information related to at least one access code, a keypad 203 for inputting commands and for selecting an access code, and a communications port, preferably an IR (infrared) port complying with a known standard such as an IrDa (Infrared Data Association) standard. The electronic key device 201 may be a mobile phone, a PDA (personal digital assistant), a handheld computer, a smart card, a PSION terminal, a bar code reader, or another terminal that can emit an infrared or radio-based signal or other type of signal which can be received by a lock control unit 221 controlling access to the location, for example by controlling a lock of a door. An electronic key device may also be mountable on or in a vehicle. Embodiments of an electronic key device 201 according to the invention are further described in connection with FIGS. 5*a*–*b*.

It applies in general to all types of electronic key devices that they should be capable of being updated with information on access codes and other information that can identify a lock control unit 221 or a combination of a lock and a door, e.g. information on a combination of numbers which has to be entered via the keypad 203. Preferably, the electronic key device 201 is capable of emitting an electronic signal including an access code which can activate the lock control unit 221 either wirelessly or via some other form of link. Preferably, infrared signals or radio transmission is used.

The lock control unit 221 comprises a receiver 227 for receiving the signal with the access code transmitted by the communications port 209 of the electronic key device 201. The receiver 227 should be compatible with the communications port 209, and preferably, the receiver 227 is an IrDa port. The receiver 227 is connected to a processing unit 222 which is connected to a memory 223, such as a RAM or EPROM. The memory 223 is capable of storing access codes valid for the lock control unit 221, and the processing unit 222 is adapted to compare the received access code with the stored access codes. The processing unit 222 further controls the storing and retrieving of access codes, and other possible operations such as generating log data and storing them in the memory, self-test functions, or the like. The processing unit 222 is further connected to a lock control interface 224 which is adapted to control a lock mechanism 231. If the received access code is valid, the processing unit 222 may send a control signal to the lock control interface 224 which causes the lock control interface 224 to initiate operating the lock mechanism 231 and thereby granting access to the location. The lock control unit 221 further comprises a user interface 226, comprising a display 226a and a keypad 226b, via which an authorised user may enter, edit and delete valid access codes and otherwise control the lock control unit 221, for example in connection with maintenance, testing, manual operation or the like. The entered access codes are stored in the memory 223. Alternatively or additionally, the lock control unit 221 may comprise an input port, such as a standard serial connector, for connecting a separate device for entering the access codes and controlling the lock control unit 221.

The lock control unit 221 is connected to a lock mechanism 231, such as a door lock system, a valve control system, or the like. The connection may be an electrical or mechanical connection or a wireless communications link. Alternatively, instead of a separate lock mechanism 231, the lock control unit 221 itself may contain corresponding electrical, electronic and/or mechanical components, such as an electric engine which could open a valve, or an electric device which could open a door.

The lock mechanism 231 comprises a unit which, for example via an electrical/electronic relay, can activate a lock (not shown) which is for example mounted on a door. The lock mechanism 231 may be connected to an existing door telephone system in a building, or it may be adapted to operate independently, via its own mechanical parts and its own power supply. Preferably, the lock mechanism 231 is capable of receiving from and optionally also emitting a signal to the lock control interface 224. A verification process may be provided hereby, where the security concerning the access control system according to the invention is enhanced even further.

Furthermore, if a delivery man, for example, has a number of stairways or companies on his round which are protected by magnetic card readers, the electronic key device may be a smart card with chips into which information has been input by a key manager, so that the doors on the round can be opened by means of the smart card.

Figure 2B:
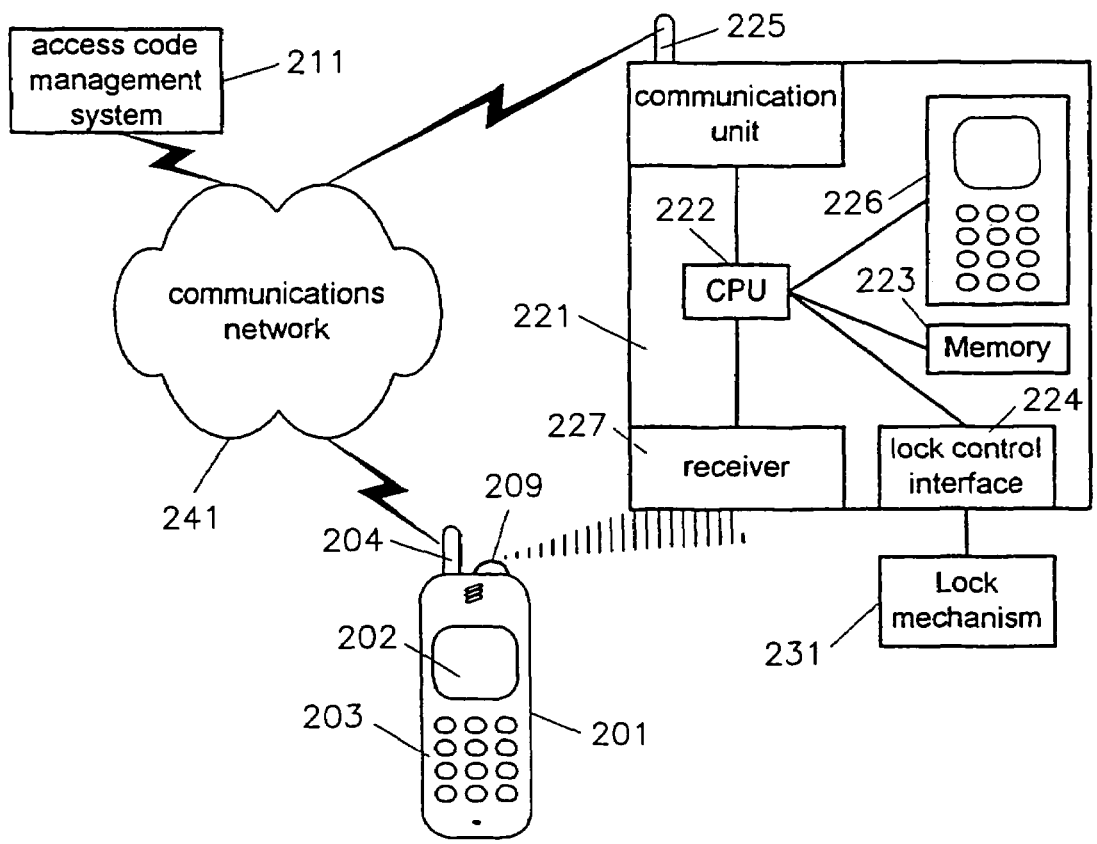

FIG. 2b illustrates a second embodiment of a lock control system according to the invention, comprising an electronic key device 201, for example a mobile phone, with a display 202 and a keypad 203 for controlling the device 201 and for selecting one of the access codes which may be stored in the device. The electronic key device 201 is equipped with a communications port 209 for transmitting control signals to the lock control unit 221. The communication may utilise electromagnetic radiation, such as IR or radio communication, or any other suitable communications technology such as sound. The communication may follow a proprietary protocol or, preferably, a standard protocol such as TCP/IP, IrDa, a telephone data protocol, a mobile telephone data protocol, http, Bluetooth, sound, etc. The information is transferred either using a proprietary data format or, preferably, a standard format, such as wml, html, binary code, machine code, AT-commands, voice commands or the like.

Instead of a wireless communication between the electronic key device 201 and the lock control unit 221, the communication may involve physical contact between the units, if, for example, the electronic key device is a smart card or a card with magnetic information stored on it or other devices which are physically connectable to the lock control unit, for example via a plug or connector.

The electronic key device 201 is further equipped with a communications interface 204, for example the transmit/receive aerial of a mobile phone. Via the communications interface 204 the electronic key device 201 may be connected to an access code management system 211. The communication may be a radio-based communication, preferably via a standard communications network 241, for example a standard mobile telephone network. Via the communications link between the electronic key device 201 and the access code management system 211, access codes may be transmitted from the access code management system 211 to the electronic key device 201. This data transmission may utilise the so-called Short Message Service (SMS) or other higher speed data channels, e.g. GSM data, WAP or various data channels of CDMA transmission systems. Alternatively or additionally, other suitable communications channels using a proprietary or standard protocol such as TCP/IP, http, voice messages, etc. may be used Preferably, the access code management system 211 is a computer system, preferably comprising one or more standard computers, such as personal computers, workstations, application servers, database and web servers, interconnected via a local area network and with access to the communications network 241, for example via a service provider. The access code management system 211 generates and administers the access codes as described in connection with FIGS. 3 and 9a–b. The access code management system 211 transmits access codes to the electronic key device 201 and/or the lock control unit 221. The access codes may be transmitted upon request from a user or automatically. Additionally, the access code may be transmitted periodically, in order to replace the access codes on a lock control unit and the corresponding electronic key devices, thereby improving the security of the system. The access code management system 211 may also automatically, or upon request, invalidate access codes by sending a corresponding control signal to the lock control unit 221 and/or the electronic key device 201.

The lock control unit 221 comprises a communications unit 225 to receive the data transmitted from the access code management system 211. Additionally or alternatively, the lock control unit 221 may comprise a user interface 226 or another input port as described in connection with the first embodiment of the access control system illustrated in FIG. 2a. The lock control unit 221 further comprises a processing unit 222, a memory 223 for storing access codes and executable computer program code, a receiver 227 for receiving control signals from the electronic key device 201, and a lock control interface 224 as already described in connection with the first embodiment of the access control system illustrated in FIG. 2a.

Figure 2C:
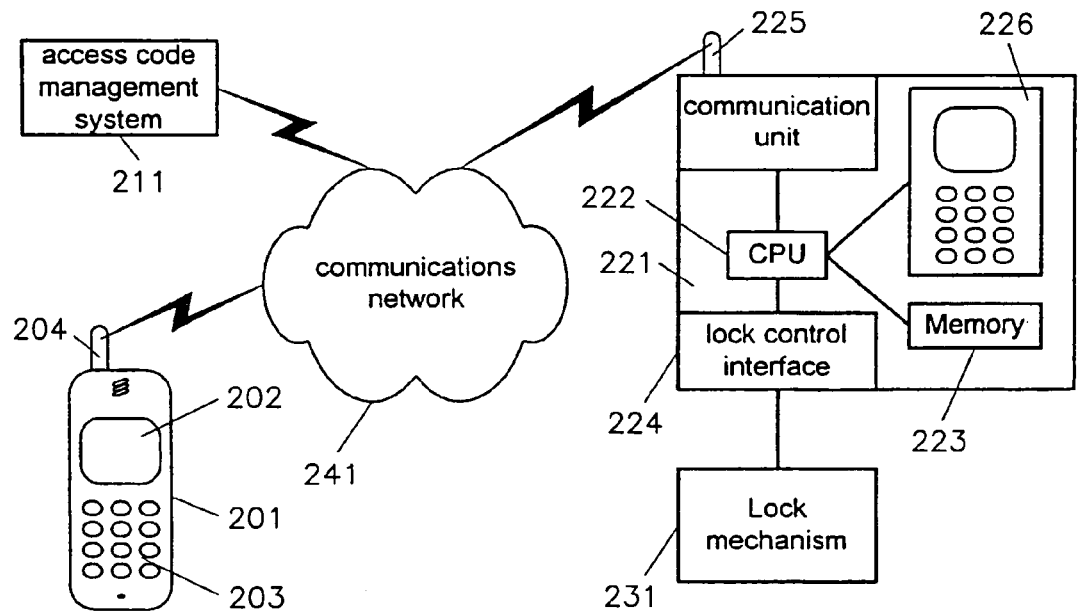

Now referring to FIG. 2c, in a third embodiment of an access control system according to the invention the electronic key device 201 may only comprise one communications interface 204, e.g. the transmit/receive aerial of a mobile phone, for connecting the device to a communications network 241 such as mobile telephone network. In this embodiment, the electronic key device 201 either communicates directly with the lock control unit 221, for example via SMS messages sent via the communications network 241, or the electronic key device 201 communicates with the lock control unit 221 via the access code management system 211, for example via SMS messages, WAP, voice or other communications channels.

In a preferred embodiment, the electronic key device 201 may also be a computer, such as a stationary or portable PC with access to the Internet. In this embodiment, a user may, via a software application, such as a browser, send a selected access code to the access code management system 211 for verification and/or further transmission to the lock control unit 221. In this embodiment, a user may gain remote access, from his computer, to a location, such as a machine or device. Furthermore, the access code management centre 211 may, e.g. in randomly chosen time intervals, change the access code valid for the remote-controllable machine, and send the access code to the user's computer and the lock control unit 221 which controls access to the machine.

Figure 3:
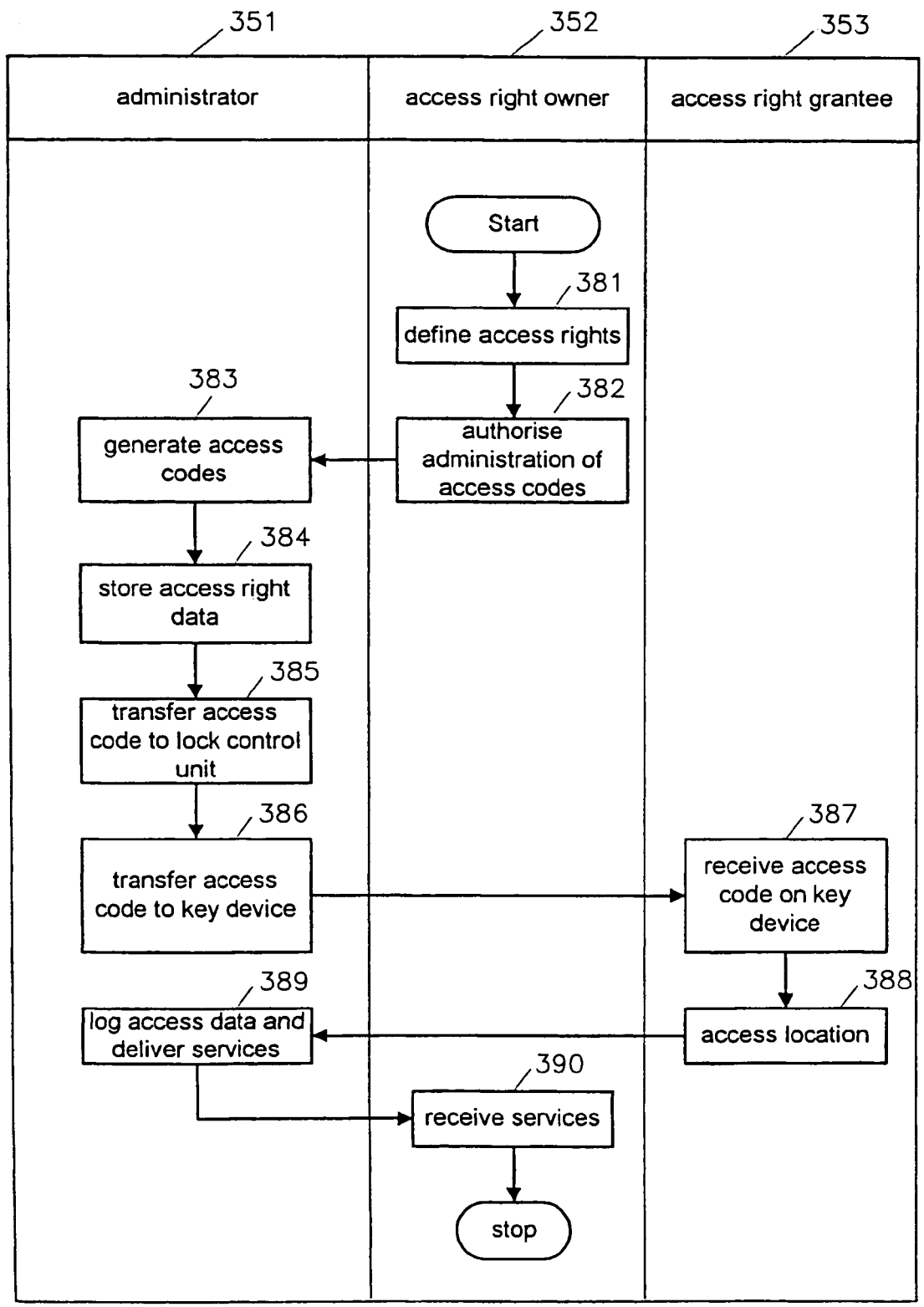
FIG. 3 shows a flow diagram of the access code management process according to an embodiment of the invention.

FIG. 3 illustrates a flow diagram of the process of managing access rights according to the invention. FIG. 3 also illustrates whether the individual process steps are performed by, or under control of, the administrator 351, the access right owner 352, or the access right grantee 353. In the initial step 381, the access right owner 352 defines the access rights to be granted, possibly including a list of possible access right grantees. In step 382, the access right owner 352 authorises the administrator 351 to generate and assign access keys. This authorisation may comprise different levels of authority and, preferably, is described in a contract as described in connection with FIG. 1b. By means of an access code management system, the administrator 351 in step 383 transforms the access right definition into a set of electronic access codes identifying the individual rights or group of rights as described in connection with FIG. 4. The definition and generation of the access codes and possibly the design and production of the electronic key devices may be performed by the administrator 351 on request from the access right owner 352 or in collaboration between the two and possibly a third party. In step 384, the access codes and other related data are stored, preferably in a database of the access code management system as described in connection with FIG. 8b.

After the generation 383 and storage 384 of access codes, the access codes are transferred in step 385 from the access code management system to the lock control units at the respective locations. The transfer of access codes may be done by the administrator 351 or, alternatively, by the access right owner 352, the access right grantee 353, or a third party. Similarly, the transfer 386 of access codes to the electronic key devices may be performed by the administrator 351 or, alternatively, by the access right owner 352, the access right grantee 353, or a third party. After receiving 387 the access codes, the access right grantee 353 may access the location (step 388).

In addition to the access codes, the access right grantee 353 has electronic key devices which are capable of operating in connection with the access control system according to the invention. This may imply specific hardware, software and communications requirements which may be prerequisites for being able to communicate with the lock control units designated by the access right owner 352. These requirements are preferably regulated in the contracts between the access right owner 352 and the administrator and between the administrator 351 and the access right grantee 353, respectively. The contract may designate types of devices which can be used, or include terms regulating a possible design and manufacturing of electronic key devices and their possible peripherals (software as well as hardware).

Preferably, in step 389, data about the use of access codes and electronic key devices is logged at the access code management system. Alternatively or additionally, log data may be stored in the lock control units and/or the electronic key devices. The log data may be transmitted to the access code management system at predetermined time intervals, on request, or on-line in connection with an interaction between an electronic key device and a lock control unit.

The administrator 351 may provide additional services to be received 390 by the access right owner 352. Alternatively or additionally, the administrator 351 may provide services to the access right grantee 353 or a third party. Preferably these additional services include providing and/or analysing information to the corresponding access rights, where the information may include information about:

The location of the lock control units.

The access rights and codes specifying the corresponding access right grantee 352, including a specification of the locations, lock control units, times of allowed access, types of allowed access, etc.

Specification of electronic key devices which have or have had a given access code or access right assigned to it.

Status information about lock control units, where status may include "locked", "open", "maintenance required", "manual operation", etc.

Status information about the location.

Information about which electronic key devices have been used in connection with which lock control unit or location, when, how, where, how many times, why, etc.

Consequently, system information and interface information may be used to create information services and tracking systems to enhance the value of the total system. A connection to external services such as e.g. GIS, GPS, Internet services, or the like, may further increase the number of possible services provided. A connection of a lock control unit to GPS, for example, may allow the tracking of containers and allow the supervision of which container has been opened when and where.

The above services may also be used where there is a need for supervising the use of the granted access rights. This could be in situations where goods are promised to be delivered at a certain time and at a certain location, and where the administrator 351 may provide information about when, where and how access has been granted to relevant delivery staff.

The possibility of granting access for a limited number of times is also an option by which e.g. e-commerce deliveries may be supported. In this case the administrator 351 is able to allow an access right owner to grant access to the location on a one-time basis or for a predetermined number of times. This functionality may either be provided by the administrator 351 upon request, or the access right owner 352 may have tools or functionality to perform this functionality, e.g. via a user interface of a lock control unit, or via remote communication with the access code management system, e.g. via a telephone, Internet application or the like. Furthermore, a one-time access right may be linked to a password in order to achieve additional security.

Figure 4:
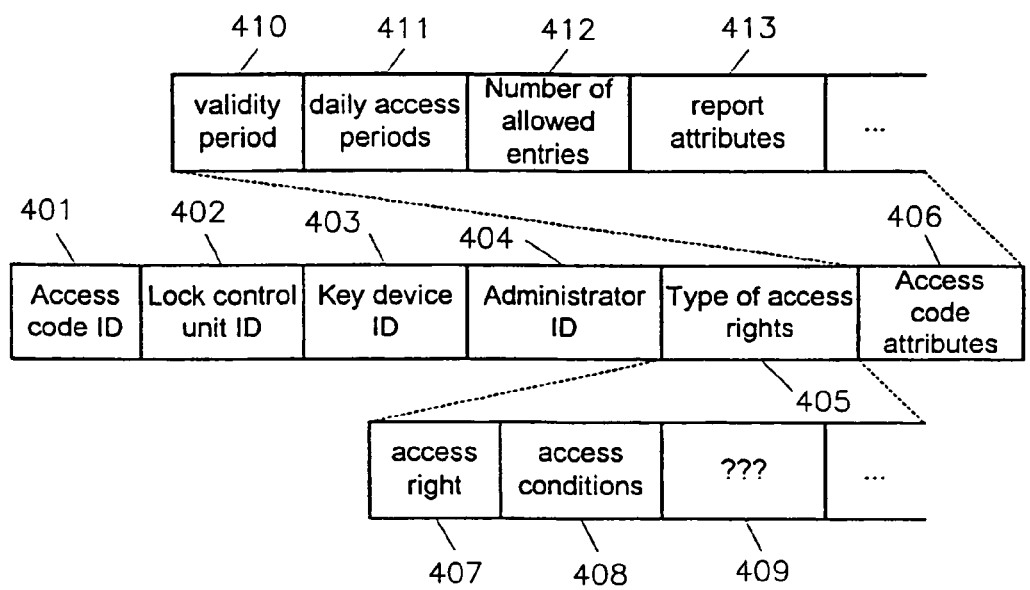
FIG. 4 shows an example of an access code according to an embodiment of the invention.

FIG. 4 illustrates an embodiment of the data format of an access code according to the invention. As mentioned above, the access codes are generated by the access code management system. The access code preferably comprises a sequence of data items which may be transferred to the lock control units and electronic key devices. It is understood that the preferred data format may depend upon the type of access rights, the storage capacity of the electronic key device or the lock control unit. The access code may comprise a binary code, an ASCII code, a sequence of phonemes or voice commands, touch tones, sound, or the like. The access code data format illustrated in FIG. 4 comprises a sequence of bytes, starting with a header 401 including for example a 4 byte access code ID. The access code further comprises the following identifications: A lock control unit ID 402, which identifies the lock control unit or a group of lock control units for which the access code is valid, a key device ID, identifying the electronic key device or group of key devices which is/are authorised to use this access code, and an administrator ID 404. It is understood that these additional IDs are optional and that they may be omitted or set to default values. The access code illustrated in FIG. 4 further comprises additional optional fields, comprising information about the type of access rights 405 and additional access code attributes 406. The type of access right 407 may for example be a 1 byte field specifying the type of access right, such as a security level, whether it is a time-limited access right, or an access right which is limited to a number of times, etc. The access conditions field 408 specifies whether the access right is conditioned on e.g. a password. Some types of access rights require additional parameters, e.g. a validity period 410, a time period for every weekday 411, a number of allowed entries 412.

Finally, the access code comprises additional report attributes 413 controlling e.g. the detail of data logging in the lock control unit, a request for reporting each access incident to the administrator, or the like.

The possibility of including these functions in the access code allows the creation of e.g. self-destructive access codes and codes which have unique characteristics (e.g. could only be used between 4:00 and 6:00 am).

It is understood that these options may be included in the access code transmitted to the electronic key device and/or the lock control unit. In order to reduce the memory requirements in the electronic key device, which may comprise a SIM card with limited storage capacity, it may be sufficient to only store parts of the access code, e.g. only the access code ID 401, in the electronic key device, while the remaining fields are stored in the lock control unit together with the access code ID 401. In this situation, the lock control unit may identify the access code on the basis of the access code ID 401 and retrieve the remaining parameters stored in the lock control unit in order to process a received request.

Figure 5A:
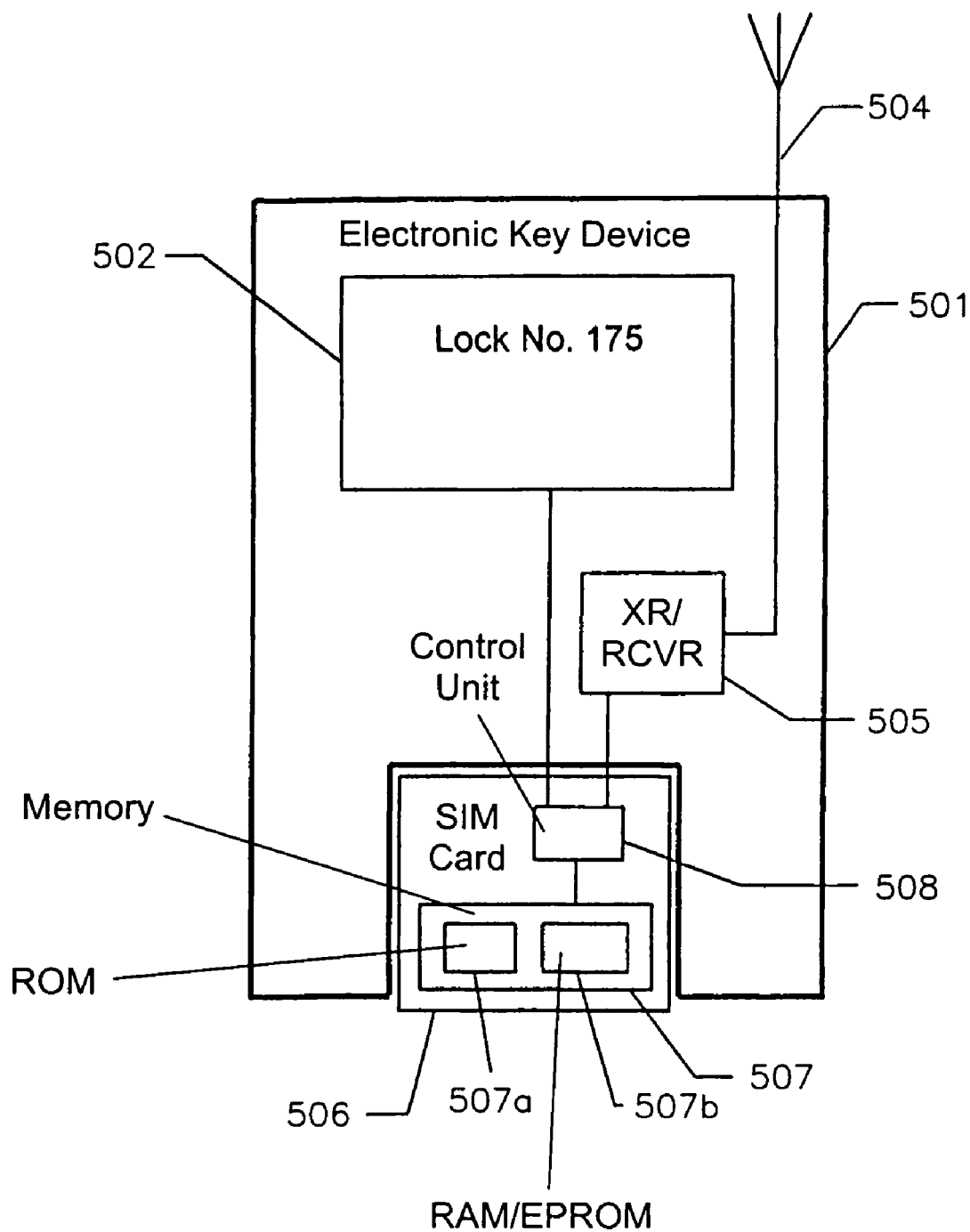
FIG. 5a–b show embodiments of an electronic key device according to the invention.

FIG. 5a shows a first embodiment of an electronic key device according to the invention. The electronic key device 501 may be a standard GSM telephone, as illustrated in FIG. 5a. The electronic key device comprises a removable SIM card (Subscriber Identity Module) 506, a transmit/receive aerial 504, a transmit/receive circuit 505, and a display 502 for displaying access code information to the user.

The SIM card 506 comprises a processor or control circuit 508 and a memory 507. The memory may be divided into a ROM 507a with the SIM operating system and other program code stored on it, and a RAM and/or EPROM 507b for storing data items and for use by the control unit.

When data items comprising access codes are received by the aerial 504 from the access code management system or a service provider, they are routed via the circuit 505 to the SIM card 506, where the control unit 508 stores the data in the memory 507b.

When the user requests an access code, via the keypad (not shown) of the electronic key device, the control unit 508 retrieves the access code from the memory 507b and displays the access code and/or related information on the display 502.

According to the invention, the user may issue a command via the keypad for initiating the use of a selected access code. On request from the user, the control unit 508 initiates transmitting the selected access code via the circuit 505 and the aerial 504 to the lock control unit or, alternatively, the access code management system. The application software controlling the storing, retrieval, selection, and transmitting of access codes is stored in the memory 507a.

Figure 5B:
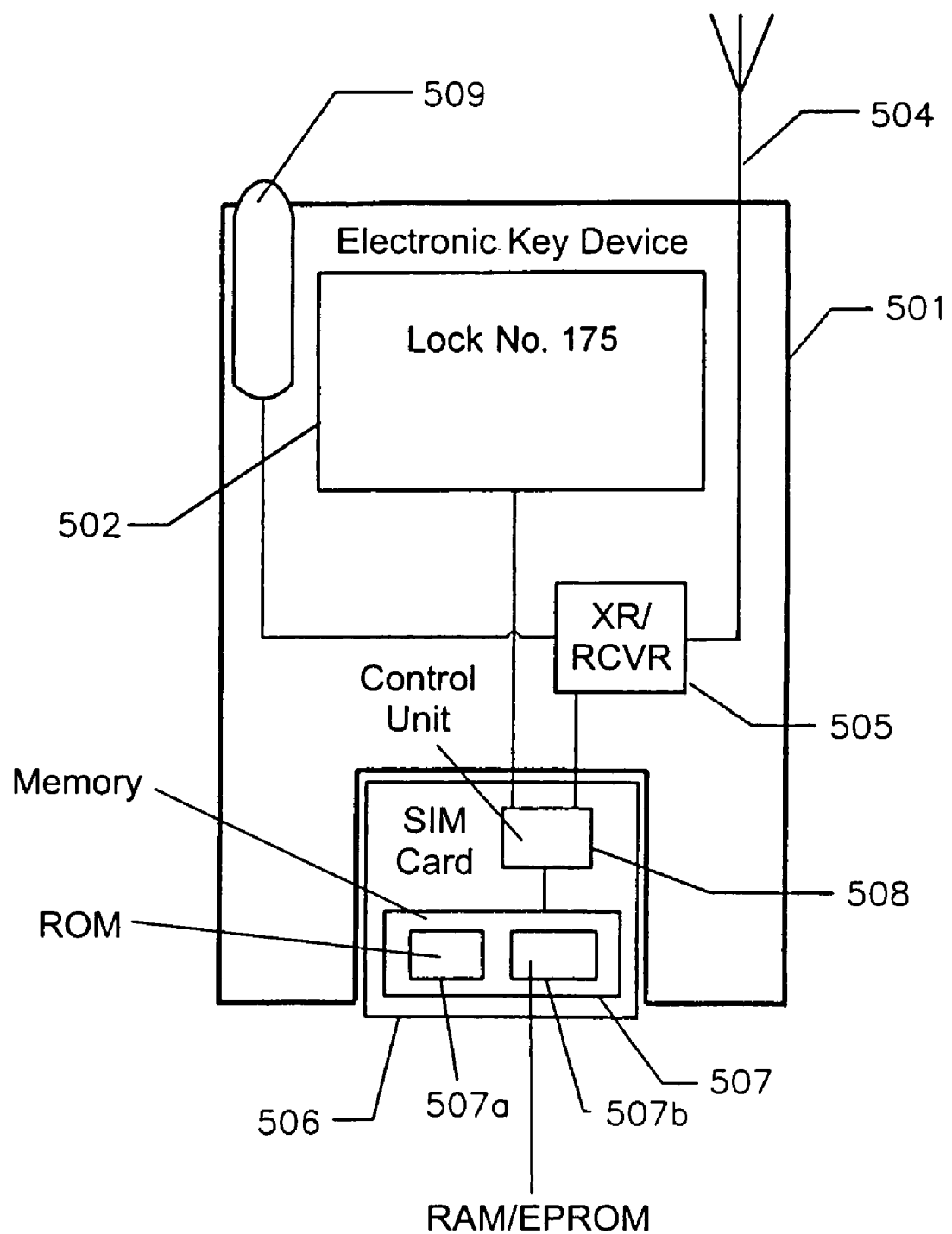

FIG. 5b shows a second embodiment of an electronic key device according to the invention. The electronic key device 501 of FIG. 5b comprises a removable SIM card 506, a transmit/receive aerial 504, a transmit/receive circuit 505, and a display 502 for displaying access code information to the user.

In this embodiment, the receiving, storing and selection of access codes are performed like in the first embodiment shown in FIG. 5a. However, the electronic key device of FIG. 5b further comprises an infrared communications port 509, preferably following the IrDa (Infrared Data Association) standard. The infrared port is connected to the circuit 505.

According to the invention, the control unit 508 is adapted to initiate the transmission of the selected access code via the circuit 505 and the infrared port 509 to a corresponding port of the lock control unit. This may, for example, be achieved by adapting the operating system stored in the memory 507a to allow the application software to control the communications port 509. The application software controlling the storing, retrieval, selection, and transmitting of access codes is stored in the memory 507a.

It is an advantage of the infrared communication that it allows a fast transmission of the access code to the lock control unit and, therefore, a short response time from the user issuing the command to the lock control unit operating the lock mechanism. Furthermore, the infrared transmission has the advantage that it does not involve costs for using a communications network.

It is understood that, alternatively, other communications means, such as a Bluetooth communications port, acoustic signals, or the like, may be used.

Figure 6A:
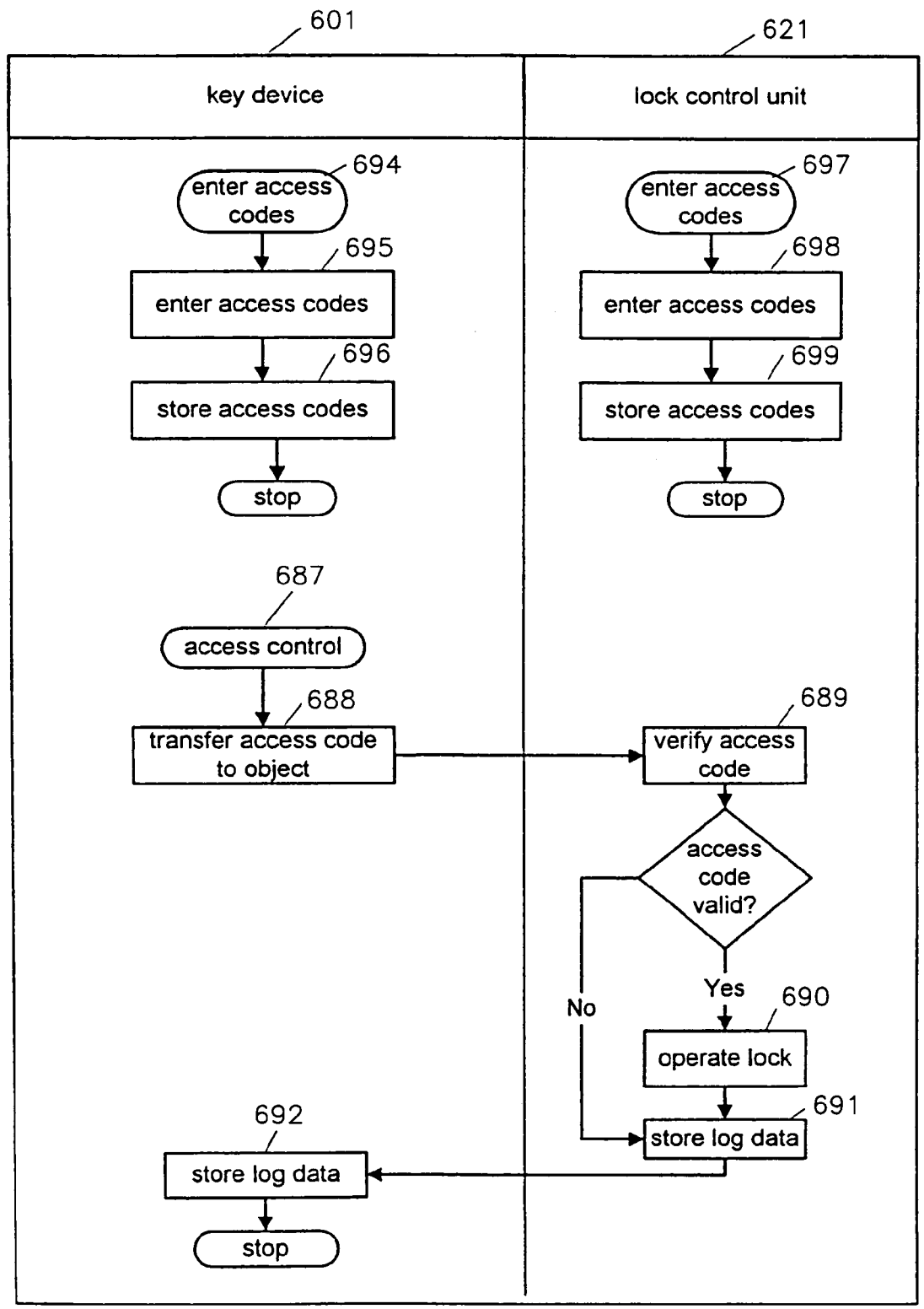
FIG. 6a–c show flow diagrams of three embodiments of the access control process according to the invention.

FIG. 6a shows a flow diagram of a first embodiment of the communications process between the electronic key device 601 and the lock control unit 621 according to the invention.

According to this embodiment, a number of access codes are entered manually in the electronic key device 601 and the lock control unit 621 and stored in their respective memories, as illustrated by steps 694–696 and 697–699, respectively. The manual entry 695, 698 of access codes by a user-may for example utilise switches, such as DIP-switches, or a keypad on the electronic key device and the lock control unit, respectively. The electronic key device may also be connected to the access code management system, e.g. via a cable connection, a docking station, an infrared or Bluetooth port or the like. The manual entry may be performed by the administrator, the access right owner, the access right grantee or a third party.

The steps 687–692 in FIG. 6a illustrate an access control session, where an access right grantee requests access to a location via an electronic key device 601 and a lock control unit 621. Upon request from the user, in step 688 a selected access code is transmitted from the electronic key device 601 to the lock control unit 621, e.g. via infrared communication as described in connection with FIG. 5b. In step 689 the lock control unit verifies the received access code with the access codes stored in the memory of the lock control unit. If the received access code corresponds to one of the valid stored access codes, the lock mechanism is operated in step 690, thereby granting access to the location. The operation may comprise unlocking and/or locking the lock mechanism, since restricting access to a location may also require a granted access right. If the verification 689 of the access code fails, the lock mechanism is not operated. In both cases log data about the above session may be generated and stored in the memory of the lock control unit and/or the electronic key device, as illustrated by steps 691 and 692, respectively.

Figure 6B:
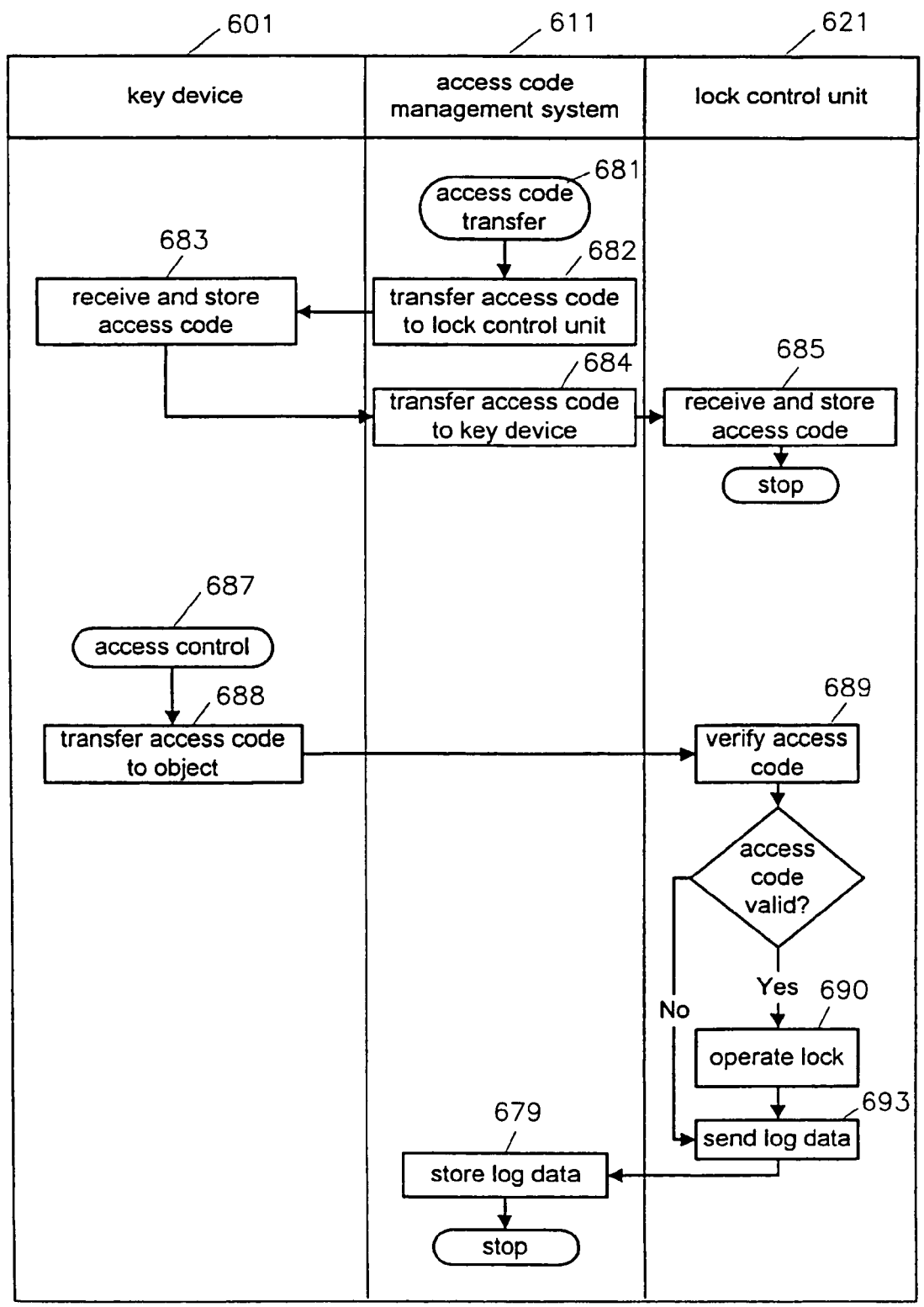

FIG. 6b illustrates a second embodiment of the communication between the electronic key device 601 and the lock control unit 621 according to the invention. Instead of the manual entry of access codes as described in connection with FIG. 6a, the access codes may be transmitted from the access code management system 611 to the electronic key device 601 and/or the lock control unit 621 via a communications channel, such as data or telephone communication as described in connection with FIG. 2b. The steps of transmitting and storing the access codes are illustrated as steps 681–685 in FIG. 6b.

The transmission 682 from the access code management system 611 to the electronic key device 601 may further comprise transmitting application software components and possibly communications software components in order to enable the electronic key device 601 to perform the operations of storing, retrieving, selecting and transmitting access codes. The transmission of application software may be advantageous if the electronic key device 601 is a standard device such as a PAD or a mobile phone. The application software may further comprise compression and/or encryption features.

The application and communications software components may be transmitted by means of e.g. the Internet, docking stations, mobile telecommunication (OTA), radio based communication, local radio based networks such as Bluetooth, or other means of data communication.

Once the access codes and possibly necessary software components are transmitted to and stored in the electronic key device 601 and the lock control unit 621, the steps 687–690 of the access control session may be performed as described in connection with FIG. 6a. Instead of storing the log data locally in the lock control unit 621 and the electronic key device 601, as described in connection with the steps 691–692 of FIG. 6a, in step 693 of this embodiment a message identifying the above session may be sent to the access code management system, where it is stored in step 679, preferably in a database.

Figure 6C:
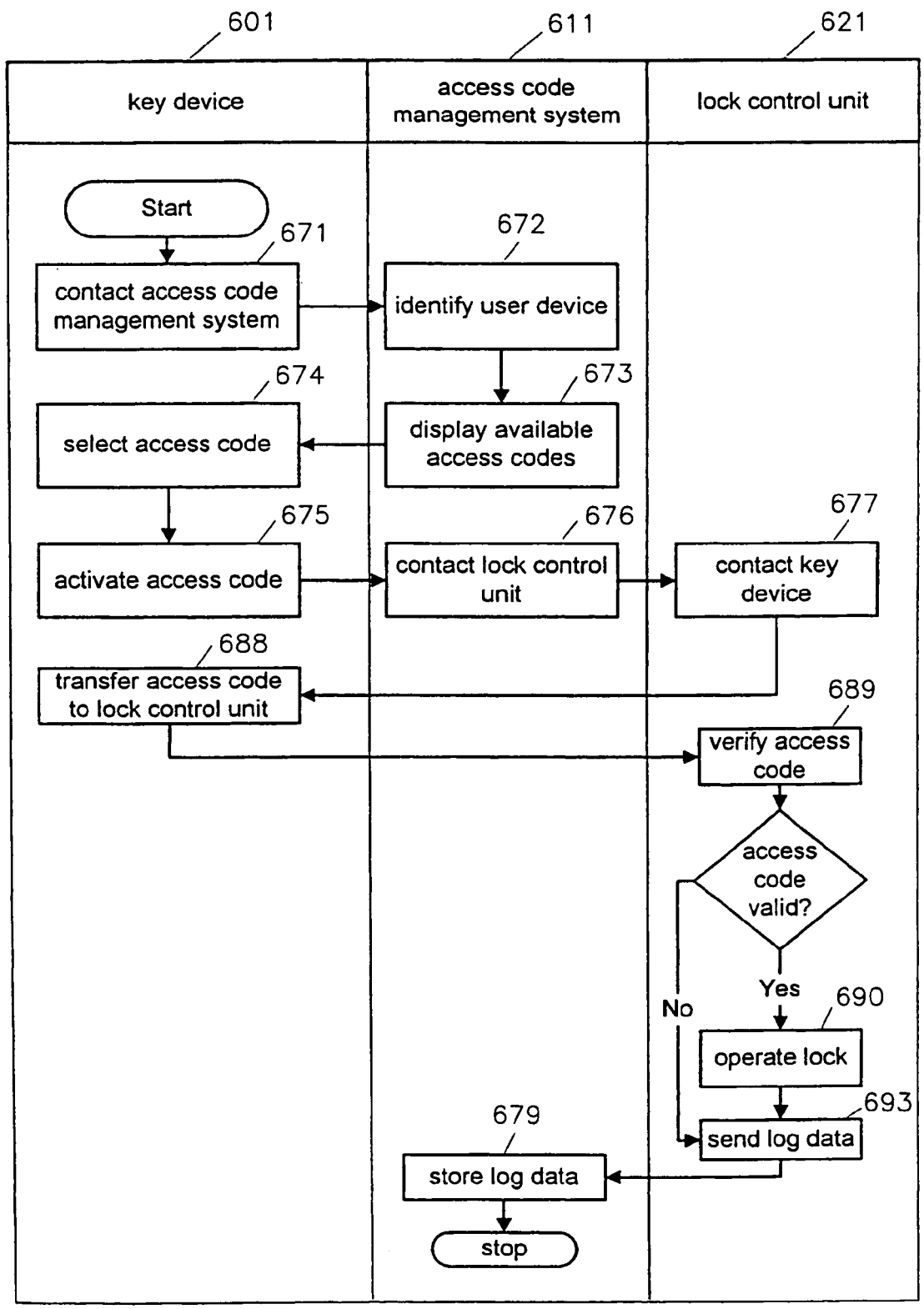

FIG. 6c shows a flow diagram of a third embodiment of the communication between the electronic key device 601 and the lock control unit 621 according to the invention. This embodiment is preferably used in connection with an access control system according to the embodiment illustrated in FIG. 2b. In this embodiment, the access code is transmitted on-line from the access code management system 611 to the lock control unit 621. It is an advantage of this embodiment that is not limited with regard to the amount of data which can be stored on a SIM card, as well as the handling of a SIM card by a specific network operator.

An example of an access control session according to this embodiment is illustrated in FIG. 6c. Upon request from the user, the electronic key device 601 contacts the access code management system 611 in step 671. The electronic key device 601 may for example be a mobile station, such as a mobile telephone or a PDA, preferably supporting WAP. A WAP application allows the electronic key device according to the invention to be managed without involving a network operator. Alternatively, the on-line communication may utilise another communications channel, such as SMS. In step 672, the access code management system 611 identifies the electronic key device 601, e.g. via its SIM card or another identification. In step 673, the access code management system 611 transmits information about available locations to the electronic key device 601. In step 674, the transmitted information may be displayed on the electronic key device 601, and the user may select one of the displayed locations or lock control units. A corresponding request is sent to the access code management system 611 in the subsequent step 675. In step 676, the access code management system 611 contacts the corresponding lock control unit 621 and transmits the access code and the identification of the electronic key device 601. In step 677, the lock control unit contacts the identified electronic key device 601, preferably via a short range and fast communications channel, such as Irda or Bluetooth, which in step 688 transfers its identification information to the lock control unit 621. In the subsequent steps 689–690, the lock control unit 621 verifies the identification of the electronic key device and operates the lock mechanism. Subsequently, the lock control unit may send log data to the access code management system 611, as already described above.

FIGS. 7a–e illustrate the data flow between the access code management system 711, the electronic key device 701 and the lock control unit 721 in different access code control scenarios according to the invention.

Figure 7A:
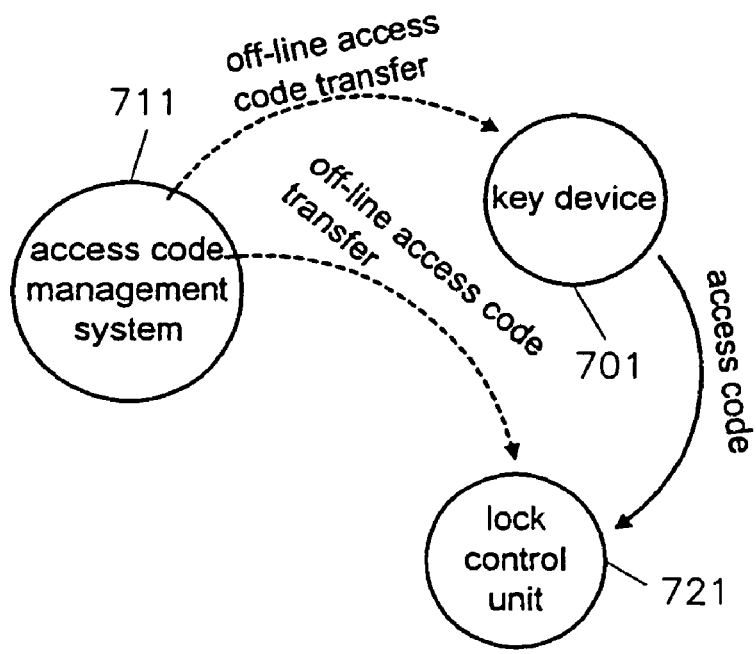
FIG. 7a–e show data flow diagrams of different embodiments of the access control process according to the invention.

FIG. 7a corresponds to the embodiment described in connection with FIG. 6a, where access codes are transferred off-line from the access code management system 711 to the key device 701 and the lock control unit 721, as illustrated by the dashed arrows in FIG. 7a. A plurality of valid access codes may be stored in the electronic key device 701 and the lock control unit 721, respectively. During the actual access control session, the electronic key device 701, transmits a selected access code to the lock control unit 721, where a verification is performed. It is an advantage of this embodiment that it does not require on-line communication between the electronic key device 701 and the access code management system 711 or between the lock control unit 721 and the access code management system 711.

Figure 7B:
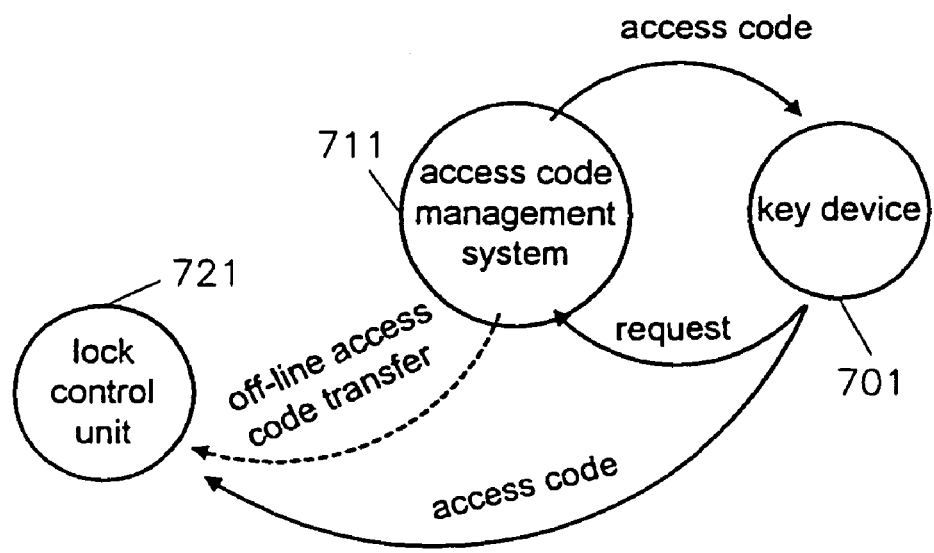

FIG. 7b illustrates an embodiment, where access codes are only transferred off-line to and stored in the lock control unit 721. During the access control session, the electronic key device 701 sends a request to the access code management system 711, which verifies the identification of the electronic key device 701, for example via a SIM card, and sends a corresponding access code to the electronic key device 701. The electronic key device 701 then sends the access code to the lock control unit 721 which compares it to its stored access codes. It is an advantage of this embodiment that it does not require storage of a large number of access codes for different locations in the electronic key device 701.

Figure 7C:
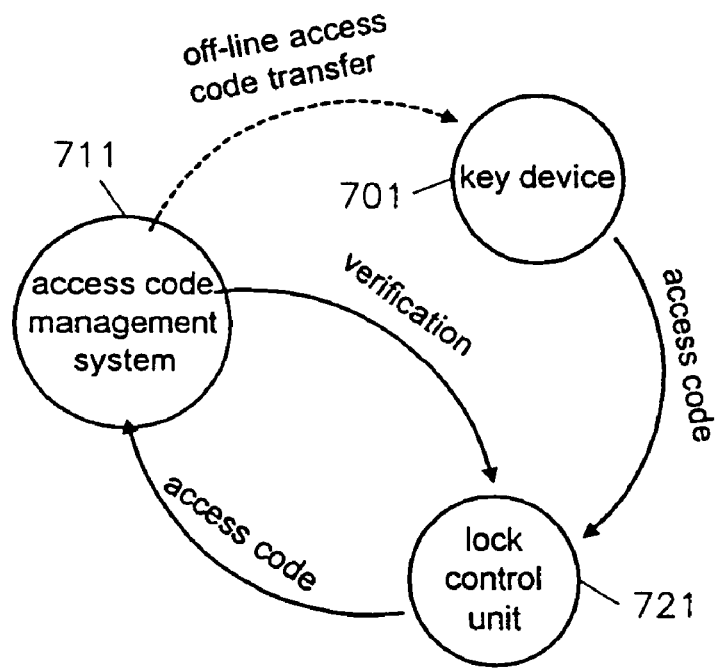

In FIG. 7c, access codes are transferred off-line from the access code management system 711 to the electronic key device 701 where they are stored in memory. During the access control session, the electronic key device 701 transmits a selected access code to the lock control unit 721, which in turn contacts the access code management system 711 and transmits the received access code to the access code management system 711. The access code management system 711 performs a verification and sends a reply back to the lock control unit 721 which may then operate the lock mechanism. It is an advantage of this embodiment that access codes only need to be stored at the access code management system 711 and in the electronic key device 701.

Figure 7D:
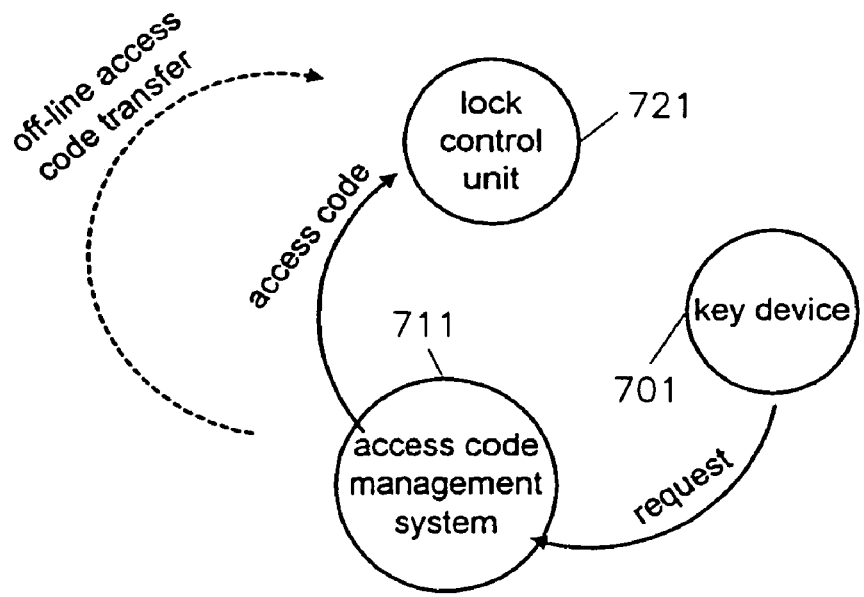

In FIG. 7d access codes are transferred off-line from the access code management system 711 to the lock control unit 721. During the access control session, the electronic key device 701 transmits a request for a selected access right to the access code management system 711 which verifies the identification of the electronic key device 701 and sends a corresponding access code to the lock control unit 721. The lock control unit 721 performs a verification against the stored access codes.

Figure 7E:
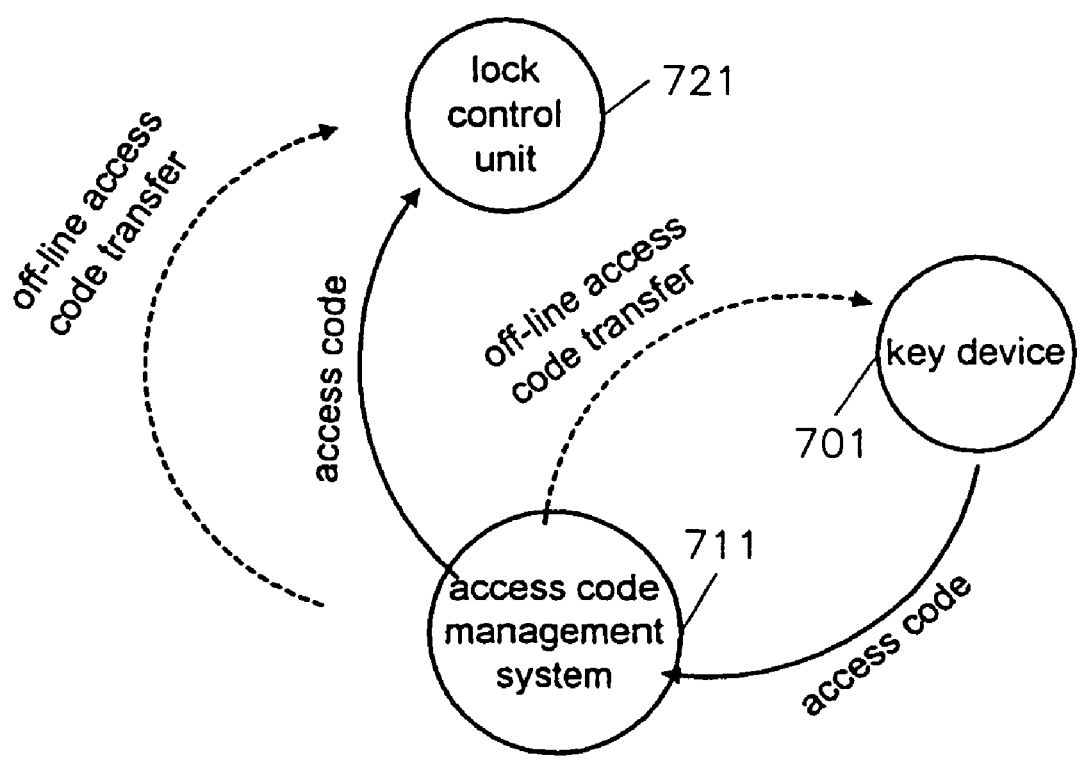

In FIG. 7e, access codes are transferred off-line from the access code management system 711 to both the lock control unit 721 and the electronic key device 701. During the access control session, the electronic key device 701 transmits a selected access code to the access code management system 711, which, possibly after a first verification process, forwards the access code to the lock control unit 721, which performs a comparison with the stored access codes. Alternatively, the last verification in the lock control unit 721 may be omitted, in which case the access codes only need to be stored in the access code management system 711.

It is understood that other data flows or combinations of the above flows are possible according to the invention.

Figure 8A:
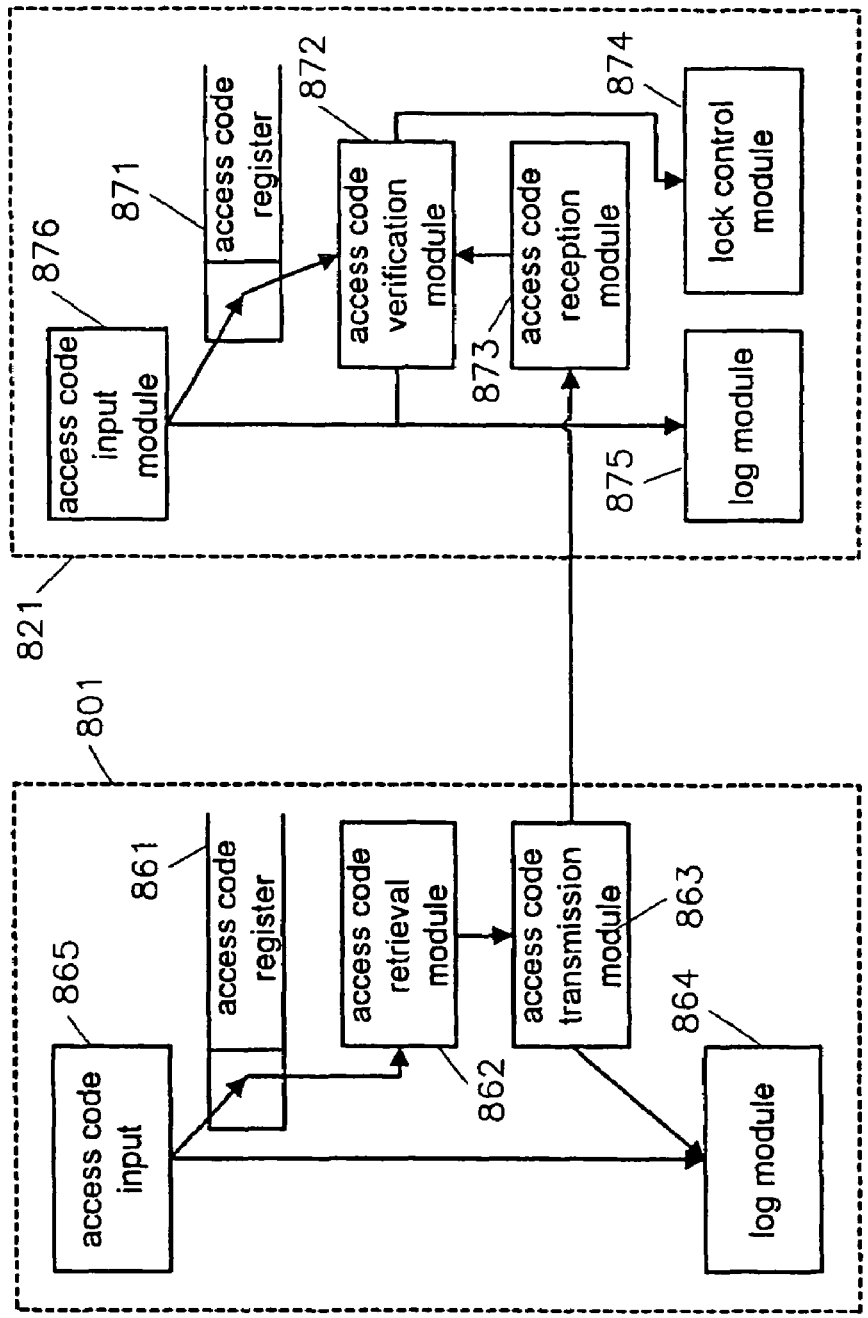
FIG. 8a–b show block diagrams of two embodiments of the software components of the access code management system according to the invention.
Figure 8B:
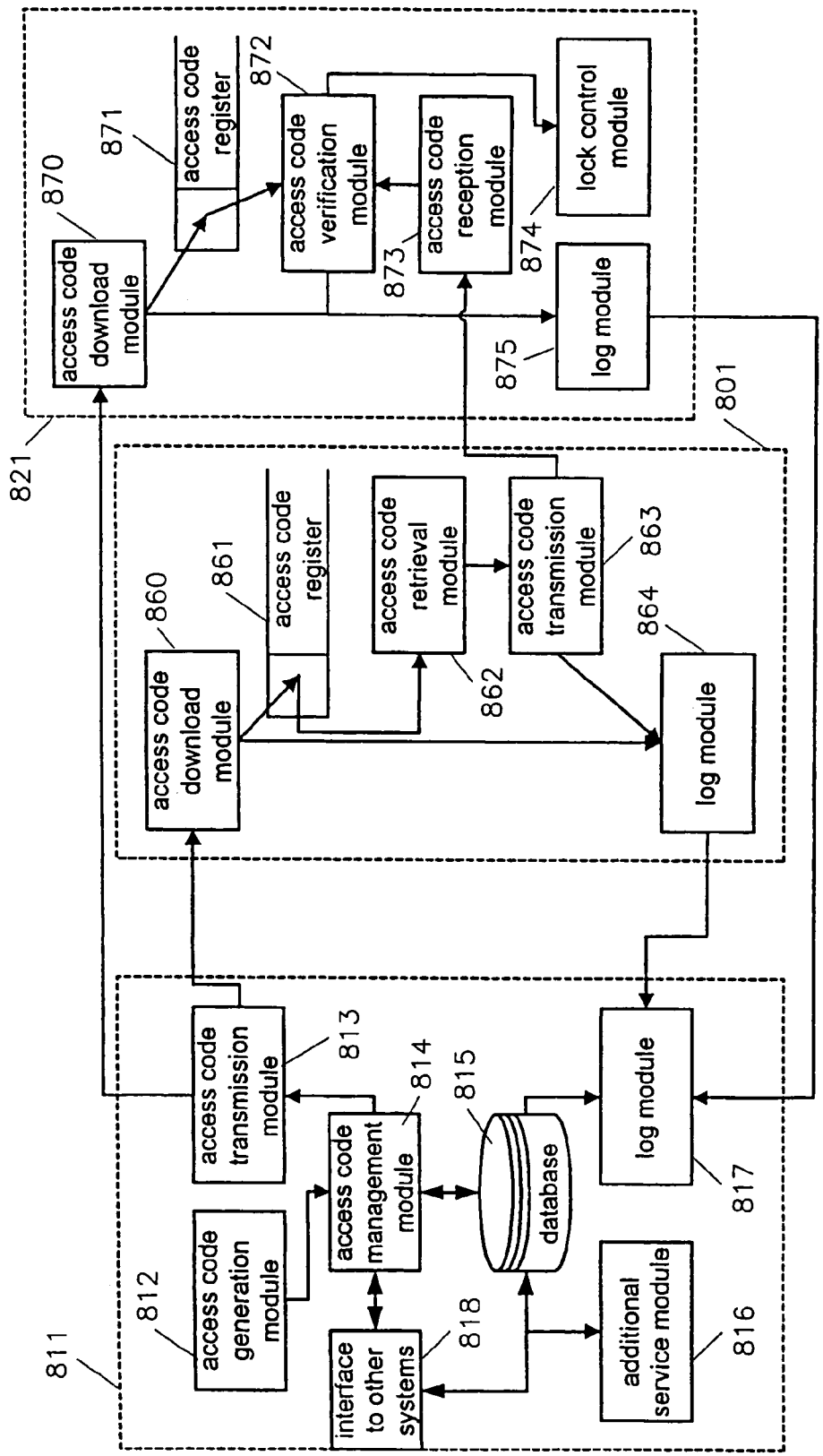

FIG. 8a–b show examples of the software architecture according to two embodiments of the invention.

Referring to FIG. 8a, the application software of the electronic key device 801 is stored in the memory and executed on the processing unit of the electronic key device 801, as described in connection with the embodiments illustrated in FIGS. 5a–b, where the memory 507a and the processing unit 508 are shown. The application software preferably comprises an access code input module 865 which receives the access codes input by a user, via the keypad, and stores the access codes in an access code register 861 which is preferably physically located in the RAM part 507b of the memory 507. An access code retrieval module 862 retrieves selected access codes from the access code register and displays them on the display 502, or passes them to the access code transmission module 863 which controls the transmission of the selected access code to the lock control unit 821. The application software may further comprise a log module 864, preferably with interfaces to both the access code input module 865 and the access code transmission module 863. The log module 864 may store relevant log data in memory, such as information about when which access codes were stored, changed or deleted, or when which access code were transmitted to which lock control unit.

The software components executed on the processing unit of the lock control unit 821 are stored in the memory of the lock control unit 821, as illustrated in connection with the embodiment of the lock control unit shown in FIGS. 2a–c, where the memory 223 and the processing unit 222 are shown. The software components of the lock control unit 821 comprise an access code input module 876 for receiving access code data input by a user via a user interface 226 or another input means. The access code input module 876 stores the access code data in an access code register 871 in the memory 223.

The lock control unit 821 further comprises an access code reception module 873, which receives the access code transmitted by the electronic key device 801. The access code reception module 873 interfaces with an access code verification module 872 responsible for the verification of the received access code. The access code verification module 872 has further access to the access code register 871 for retrieving stored access codes and comparing them with the received access code.

The access code verification module 872 further interfaces with a lock control module 874 in order to pass information about the result of the verification to the lock control unit 874. The lock control module 874 generates a control signal which is sent to the lock mechanism (not shown) and initiates operation of the lock mechanism.

The software of the lock control unit 821 may also comprise a log module 875 responsible for logging relevant data and events and storing log data in the memory 223.

Now referring to FIG. 8b, a second embodiment of the software components of an access control system according to the invention also comprises the software of an access code management system 811 as described in connection with FIGS. 2b–c. The software of the access code management system 811 comprises an access code generation module 812, responsible for generating access codes according to the granted access rights. An example of a possible data format of an access code is shown in FIG. 4. The access code generation module 812 passes the generated access codes to an access code management module 814 which is responsible for administering the access codes, i.e. storing them in a database 815 together with relevant data about the related electronic key devices, lock control units, locations, access right owners, access right grantees, etc. The access code management module 814 preferably provides suitable user interfaces for inputting and viewing relevant data. Furthermore the access code management module 814 may handle additional administrative tasks, such as automatic expiration of access codes, initiation of access code transmission to electronic key devices and/or lock control units. The access code management module 814 interfaces with an access code transmission module 813 which, upon request, handles the transmission of access codes to the electronic key devices and/or lock control units, for example by implementing one or more layers of a layered communications protocol used for the communication.

The software of the electronic key device 801 comprises a corresponding access code download module 860 adapted to receive the access code data transmitted by the access code management system 811. Similarly, the software of the lock control unit 821 comprises a corresponding access code download module 870. The software of the access code management system 811 further comprises a log module 817 which is adapted to interface with the log modules 864, 875 of the electronic key device and the lock control unit, respectively. This software interface preferably utilises the same communications interface as the transmission of access codes. It is an advantage of this embodiment that log data may be transmitted on-line from the electronic key device 801 and/or the lock control unit 821 to the access code management system 811. Preferably, the log data is stored in the database 815 of the access code management system 811. The remaining components 861–863 of the electronic key device 801 and the components 871–874 of the lock control unit are described above in connection with FIG. 8a.

The software of the access code management system 811 may further comprise one or more additional service modules 816 which may provide additional services such as statistics about the use of the access codes as described in connection with FIG. 3.

Preferably, the access code management system 811 provides functionality, which secures full visibility for the access right holder about the stored information about the access rights. To obtain the highest level of security all electronic communication may be encrypted either by a specific protocol or by means of a standard encryption method, e.g. RAS, Digital signatures, public key certificate, etc.

It will be appreciated that, for the management of the electronic keys, a company may make special software for customized management of the key information for several different suppliers, e.g. of the type which is mentioned at the beginning of the description. The customized solutions may also have incorporated therein the degree of data security which is necessary for the supplier of goods and services concerned. Thus, it is conceivable that there are several security levels in a building or a company, where some suppliers only have to pass the first level, while other suppliers have to pass higher security levels.

Preferably, the access code management system 811 may further comprise one or more interfaces to other systems 818 in order to combine and integrate the access code management system 811 with other services. This integration may allow the access right owner and/or the access right grantee to interface with the access code management system 811 from their respective administrative applications, e.g. from a SAP solution or from within another standard or proprietary computer based administration system.

Integration services may also extend to other external services such as GPS navigation systems and GIS systems, where the location of lock control units and electronic key devices may be located via their respective communications interface to the access code management system 811. This in turn implies that an access control system 811 according to the invention may be used for the tracking of access events of mobile objects such as containers, boxes, vehicles, etc.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A method of controlling access to a location secured by a lock mechanism controlled by a lock control unit having a first memory, the method comprising the steps of:
   storing a first access code in the first memory, the first access code being indicative of a predetermined access right to the location;
   storing a second access code in a second memory of an electronic key device;
   using the electronic key device for requesting access to the location by transmitting the second access code from the electronic key device to the lock control unit;
   comparing the transmitted second access code with the first access code stored in the first memory;
   if the first access code corresponds to the second access code, initiating operation of the lock mechanism;
   said step of storing the second access code in the second memory including storing a plurality of access codes for a plurality of respective locations in the second memory of the electronic key device, said step of storing the plurality of access codes including storing a plurality of access code data items, each access code data item having an identifier identifying a corresponding lock control unit for which the access code is valid; and
   initiating, by a user, transmission of a selected one of the plurality of stored access codes to the lock control unit, said user being enabled to edit and rearrange the plurality of stored access codes.

2. The method according to claim 1, wherein the electronic key device is a mobile communications device.

3. The method according to claim 1, wherein the second memory is a removable storage module removably inserted into the electronic key device.

4. The method according to claim 1, wherein the step of transmitting the second access code from the electronic key device to the lock control unit includes transmitting the second access code via wireless data communication.

5. The method according to claim 4, wherein the wireless data communication uses infrared data communication.

6. The method according to claim 1, wherein the method further comprises the step of transmitting, via a communications network, at least one access code from an access code management system to a selected one of the electronic key device and the lock control unit.

7. The method according to claim 1, wherein the method further comprises the step of storing a plurality of valid access codes corresponding to a plurality of respective access rights in the first memory of the lock control unit.

8. The method according to claim 1, wherein the method further comprises the step of storing in a third memory information about attempts to access the location.

9. The method according to claim 1, wherein the predetermined access right includes a first attribute specifying a property of the predetermined access right, and the first access code includes information about the first attribute.

10. The method according to claim 1, wherein the predetermined access right has a validity period and wherein the first access code includes information about the validity period.

11. The method according to claim 1, wherein the method further comprises the step of invalidating the first access code.

12. An access control system for controlling access to a location secured by a lock mechanism, the access control system comprising:
    an electronic key device including a first transmitting element adapted to transmit a first control signal indicative of a request for granting a predetermined access right; and
    a lock control unit including a first receiving element adapted to receive said first control signal from the electronic key device, a first processing unit adapted to perform a verification of the received request, and a control unit adapted to initiate operating the lock mechanism depending on the result of the verification;
    said electronic key device further including a memory adapted to store a plurality of access codes identifying a plurality of predetermined access rights, enabling a user to initiate transmitting a selected one of the stored access codes to the lock control unit and enabling a user to edit and rearrange the plurality of stored access codes, said memory being configured to store a plurality of access code data items, each access code data item having an identifier identifying a corresponding lock control unit for which the access code is valid.

13. The system according to claim 12, wherein the electronic key device further includes an input device for receiving data items identifying predetermined access rights.

14. The system according to claim 13, wherein the input device includes a keypad and the data items are input by a user.

15. The system according to claim 12, wherein the electronic key device further includes an input device adapted to receive input from a user indicating a selection of a first one of the plurality of access rights stored in the memory, and a display for displaying information about at least one of the plurality of access rights stored in the memory of the electronic key device.

16. The system according to claim 12, wherein the first control signal includes a first access code for the requested access right.

17. The system according to claim 16, wherein the lock control unit further comprises:
    a storage device adapted to store a plurality of data items corresponding to a plurality of access codes for respective predetermined access rights; and
    the first processing unit being adapted, upon receipt of the first control signal, to compare the first access code received via the first control signal with at least one of the plurality of access codes stored in the storage device.

18. The system according to claim 16, wherein the requested access right includes a first attribute specifying a property of the requested access right, and the first access code includes information about the first attribute.

19. The system according to claim 16, wherein the requested access right has a validity period and wherein the first access code includes information about the validity period.

20. The system according to claim 12, wherein the electronic key device is a portable communications device.

21. The system according to claim 12, wherein the first control signal is a wireless data communications signal.

22. The system according to claim 12, wherein the first transmitting means is an infrared communications port.

23. The system according to claim 12, wherein the lock control unit further includes an input device for receiving data items corresponding to access codes granting predetermined access rights.

24. The system according to claim 23, wherein the input device includes a keypad for receiving data items input by a user.

25. The system according to claim 12, wherein the system further comprises computer means including:
   storage means adapted to store a plurality of data items corresponding to respective predetermined access rights and including respective access codes;
   communications means adapted to transmit at least one access code to a selected one of the electronic key device and the lock control unit; and
   the selected one of the electronic key device and the lock control unit further including communications means adapted to receive the transmitted at least one access code.

26. The system according to claim 25, wherein a selected one of the electronic key device and the lock control unit further includes communications means for transmitting, to the computer means, an information signal indicative of information about the corresponding transmitted or received request for granting the requested access right.

27. The system according to claim 25, wherein the communications means included in said computer means is adapted to transmit a second control signal to the lock control unit initiating invalidation of at least one access code.

28. The system according to claim 12, wherein the memory of the electronic key device includes a RAM or EPROM module.

29. The system according to claim 28, wherein the electronic key device is a mobile telephone.

30. The system according to claim 12, wherein said memory includes a removable storage module adapted to store data items identifying the plurality of predetermined access rights.

31. The system according to claim 30, wherein the removable storage module further includes a second processing unit adapted to initiate transmitting a control signal indicative of a request for granting a selected one of the plurality of predetermined access rights.

32. The system according to claim 12, further comprising a computer system including:
   storage means adapted to store a plurality of data items corresponding to respective access codes indicative of predetermined access rights;
   processing means adapted to generate an access code indicative of respective access rights;
   communications means adapted to transmit the plurality of access codes to the electronic key device for storing the plurality of access codes in the memory of the electronic key device.

33. The system according to claim 32, wherein the processing means of said computer system is further adapted to generate an updated access code indicative of an access right, the updated access code being different from a previously generated the access code, corresponding to said access right;
   said communications means of said computer system being adapted to transmit the updated access code to the lock control unit; and
   said communications means of said computer system being adapted to transmit a control signal to the lock control unit initiating invalidation of the previously generated access code.

34. The system according to claim 33, wherein the processing means of said computer system is further adapted to initiate invalidation of a previously generated access code for an access right, and to generate an updated access code, corresponding to said access right and different from the previously generated access code, upon request from a user.

35. The system according to claim 33, wherein the processing means of said computer system is adapted to initiate invalidation of a previously generated access code for an access right and to generate an updated access code, corresponding to said access right and different from the previously generated access code, in predetermined time intervals.

36. A method of controlling access to a plurality of locations each secured by a lock mechanism controlled by a respective lock control unit having a lock control unit memory, the method comprising the steps of:
   for each lock control unit, storing a respective access code in the lock control unit memory thereof, the respective access code being indicative of a predetermined access right to the respective location and being different from access codes to other locations;
   inputting and storing a plurality of access codes for a plurality of respective locations in a second memory of an electronic key device, a user of said key device being enabled to input, edit and rearrange the plurality of stored access codes, said step of storing the plurality of access codes including storing a plurality of access code data items, each access code data item having an identifier identifying a corresponding lock control unit for which the access code is valid;
   initiating, by said user, transmission of a selected one of the plurality of stored access codes to a first lock control unit having a first access code for requesting access to the location controlled by said first lock control unit;
   comparing the transmitted access code with the first access code stored in the first lock control unit memory;
   if the first access code corresponds to the transmitted access code, initiating operation of the lock mechanism; and
   editing, by said user, said plurality of access codes stored in said second memory for obtaining access to a second plurality of respective locations.

37. The method according to claim 36, wherein said steps of inputting and editing include transferring said access codes from an access code management system.

38. The method according to claim 36, wherein said steps of inputting and editing include inputting said access codes using a keypad on said electronic key device.

* * * * *